(12) United States Patent
Dijkstra et al.

(10) Patent No.: US 10,779,676 B2
(45) Date of Patent: Sep. 22, 2020

(54) CAPSULE, A SYSTEM FOR PREPARING A POTABLE BEVERAGE FROM SUCH A CAPSULE AND USE OF SUCH A CAPSULE IN A BEVERAGE PREPARATION DEVICE

(71) Applicant: Koninklijke Douwe Egberts B.V., Utrecht (NL)

(72) Inventors: Hielke Dijkstra, Utrecht (NL); Arend Hendrik Groothornte, Utrecht (NL); Erik Pieter van Gaasbeek, Utrecht (NL); Marc Henrikus Joseph Ottenschot, Utrecht (NL); Ralf Kamerbeek, Utrecht (NL); Armin Sjoerd Eijsackers, Utrecht (NL); John Henri Flamand, Utrecht (NL); Andrew Michael Halliday, Utrecht (NL); Nicholas Andrew Hansen, Utrecht (NL)

(73) Assignee: Koninklijke Douwe Egberts B.V., Utrecht (NL)

( * ) Notice: Subject to any disclaimer, the term of this patent is extended or adjusted under 35 U.S.C. 154(b) by 139 days.

(21) Appl. No.: 15/813,052

(22) Filed: Nov. 14, 2017

(65) Prior Publication Data
US 2018/0289201 A1  Oct. 11, 2018

Related U.S. Application Data

(63) Continuation of application No. PCT/NL2016/050349, filed on May 13, 2016.

(30) Foreign Application Priority Data

May 15, 2015 (WO) ................ PCT/NL2015/000018
May 15, 2015 (WO) ................ PCT/NL2015/050349

(Continued)

(51) Int. Cl.
 *A47J 31/36* (2006.01)
 *H04W 48/02* (2009.01)
 (Continued)

(52) U.S. Cl.
 CPC ......... *A47J 31/3695* (2013.01); *A47J 31/407* (2013.01); *B65D 85/8043* (2013.01);
 (Continued)

(58) Field of Classification Search
 CPC ............................................ A47J 31/36–3695
 See application file for complete search history.

(56) References Cited

U.S. PATENT DOCUMENTS 4,651,538 A  3/1987 Bull
5,897,899 A  4/1999 Fond
(Continued)

FOREIGN PATENT DOCUMENTS

AU  2015255218 A1  11/2015
AU  2016253679 A1  11/2016
(Continued)

OTHER PUBLICATIONS

Nullity Action on DE 202016106171.7, 96 pages (Dec. 20, 2019).
(Continued)

*Primary Examiner* — Michael A Laflame, Jr.
(74) *Attorney, Agent, or Firm* — Fitch, Even, Tabin & Flannery LLP

(57) ABSTRACT

A capsule containing a substance for the preparation of a potable beverage. The capsule comprises an aluminum capsule body having a side wall and an outwardly extending flange and a sealing member at the outwardly extending flange for providing a fluid sealing contact with an enclosing member of a beverage preparation device. The beverage preparation device comprises an annular element having a free contact end which may be provided with a plurality of
(Continued)

radially extending open grooves. The sealing member is integral with the outwardly extending flange and comprises at least one projection projecting from the outwardly extending flange. The projection comprising a projection top and is configured such that its projection top exerts a radial force on the free contact end of the annular element if the capsule is positioned in the enclosing member of the beverage preparation device and the enclosing member is closed by means of a closing member of the beverage preparation device.

55 Claims, 9 Drawing Sheets

(30) Foreign Application Priority Data

May 15, 2015 (WO) ................ PCT/NL2015/050352
Sep. 3, 2015 (WO) ................ PCT/NL2015/050611

(51) Int. Cl.
*H04W 4/50* (2018.01)
*H04M 1/725* (2006.01)
*B65D 85/804* (2006.01)
*A47J 31/40* (2006.01)

(52) U.S. Cl.
CPC ......... *H04M 1/72577* (2013.01); *H04W 4/50* (2018.02); *H04W 48/02* (2013.01); *H04M 1/72522* (2013.01); *H04M 1/72561* (2013.01); *H04M 1/72572* (2013.01)

(56) References Cited

U.S. PATENT DOCUMENTS

| | | |
|---|---|---|
| 2001/0048178 A1 | 12/2001 | Jud |
| 2005/0061705 A1 | 3/2005 | Spallek |
| 2009/0017177 A1 | 1/2009 | Yoakim |
| 2009/0320692 A1 | 12/2009 | Simanski |
| 2010/0015307 A1 | 1/2010 | Abegglen |
| 2010/0178404 A1* | 7/2010 | Yoakim ............... A47J 31/3628 426/431 |
| 2011/0000917 A1 | 1/2011 | Wolters |
| 2011/0020500 A1* | 1/2011 | Eichler ............. B65D 85/8043 426/84 |
| 2011/0185910 A1 | 8/2011 | Ryser |
| 2011/0259204 A1 | 10/2011 | Kaeser |
| 2012/0251694 A1* | 10/2012 | Kamerbeek ........... A47J 31/407 426/433 |
| 2013/0099597 A1 | 4/2013 | Perentes |
| 2013/0180408 A1 | 7/2013 | Eichler |
| 2013/0340478 A1 | 12/2013 | Miyoshi |
| 2014/0170271 A1 | 6/2014 | Zweed |
| 2014/0178537 A1 | 6/2014 | Zweed |
| 2014/0328983 A1 | 11/2014 | Jarisch |
| 2015/0033947 A1 | 2/2015 | Van Der Kamp |
| 2015/0151903 A1 | 6/2015 | Bartoli |
| 2015/0223632 A1 | 8/2015 | Hall |
| 2016/0037961 A1 | 2/2016 | Digiuni |
| 2016/0159563 A1 | 6/2016 | Bartoli |
| 2016/0353918 A1 | 12/2016 | Talon |
| 2016/0362246 A1 | 12/2016 | Garcin |
| 2016/0362247 A1 | 12/2016 | Bartoli |
| 2017/0158422 A1 | 6/2017 | Andreae |
| 2017/0325619 A1* | 11/2017 | Holten ................ A47J 31/3628 |
| 2018/0257856 A1 | 9/2018 | Oliver |
| 2018/0273286 A1 | 9/2018 | Dijkstra |
| 2018/0290824 A1 | 10/2018 | Dijkstra |
| 2018/0290825 A1 | 10/2018 | Dijkstra |
| 2018/0297775 A1 | 10/2018 | Dijkstra |
| 2018/0297776 A1 | 10/2018 | Dijkstra |

FOREIGN PATENT DOCUMENTS

| | | |
|---|---|---|
| AU | 2017219060 A1 | 9/2017 |
| CA | 2901582 A1 | 11/2014 |
| DE | 202016106171 U1 | 11/2016 |
| EP | 0844195 B1 | 5/1998 |
| EP | 1165398 B1 | 1/2002 |
| EP | 1190959 B1 | 3/2002 |
| EP | 1299022 B1 | 4/2003 |
| EP | 1339305 B1 | 9/2003 |
| EP | 1646305 B1 | 4/2006 |
| EP | 1654966 A1 | 5/2006 |
| EP | 1700548 B1 | 9/2006 |
| EP | 1816934 B1 | 8/2007 |
| EP | 1839543 B1 | 10/2007 |
| EP | 1849715 B1 | 10/2007 |
| EP | 1859712 B1 | 11/2007 |
| EP | 1859714 B1 | 11/2007 |
| EP | 1882431 B1 | 1/2008 |
| EP | 1882432 B1 | 1/2008 |
| EP | 1892199 A1 | 2/2008 |
| EP | 1900653 B1 | 3/2008 |
| EP | 1967099 B1 | 9/2008 |
| EP | 2012994 B1 | 1/2009 |
| EP | 2029457 B1 | 3/2009 |
| EP | 2068684 B1 | 6/2009 |
| EP | 2070828 B1 | 6/2009 |
| EP | 2142054 B1 | 1/2010 |
| EP | 2151313 B1 | 2/2010 |
| EP | 2205133 B1 | 7/2010 |
| EP | 2229082 B1 | 9/2010 |
| EP | 2230195 A1 | 9/2010 |
| EP | 2284100 B1 | 2/2011 |
| EP | 2284101 B1 | 2/2011 |
| EP | 2289820 A1 | 3/2011 |
| EP | 2308776 A1 | 4/2011 |
| EP | 2334564 B1 | 6/2011 |
| EP | 2364930 A2 | 9/2011 |
| EP | 2374383 B1 | 11/2011 |
| EP | 2385922 B1 | 11/2011 |
| EP | 2489609 A1 | 8/2012 |
| EP | 2512302 B1 | 10/2012 |
| EP | 2516296 A1 | 10/2012 |
| EP | 2573008 A1 | 3/2013 |
| EP | 2631198 A1 | 8/2013 |
| EP | 2631199 A1 | 8/2013 |
| EP | 2682028 A1 | 1/2014 |
| EP | 2690035 A1 | 1/2014 |
| EP | 2712824 A1 | 4/2014 |
| EP | 2757056 A1 | 7/2014 |
| EP | 2801538 A1 | 11/2014 |
| EP | 2868598 A1 | 5/2015 |
| EP | 3023360 B1 | 5/2016 |
| ES | 1137034 U | 3/2015 |
| ES | 1142506 U | 8/2015 |
| FR | 2973209 A1 | 10/2012 |
| GB | 2503697 B | 1/2014 |
| GB | 2503774 B | 1/2014 |
| GB | 2519319 A | 4/2015 |
| GB | 2523775 A | 9/2015 |
| WO | 2006045536 A1 | 5/2006 |
| WO | 2007122206 A1 | 11/2007 |
| WO | 2008037642 A1 | 4/2008 |
| WO | 2009115474 A1 | 9/2009 |
| WO | 2009128016 A1 | 10/2009 |
| WO | 2010055465 A1 | 5/2010 |
| WO | 2010084475 A2 | 7/2010 |
| WO | 2010115970 A1 | 10/2010 |
| WO | 2010116284 A2 | 10/2010 |
| WO | 2010128844 A1 | 11/2010 |
| WO | 2010137946 | 12/2010 |
| WO | 2010137952 A1 | 12/2010 |
| WO | 2011000005 A1 | 1/2011 |
| WO | 2011010263 A1 | 1/2011 |
| WO | 2011092301 | 8/2011 |
| WO | 2011113854 A2 | 9/2011 |
| WO | 2012011053 A1 | 1/2012 |
| WO | 2012013556 A1 | 2/2012 |
| WO | 2012038063 A1 | 3/2012 |

(56) References Cited

FOREIGN PATENT DOCUMENTS

| | | |
|---|---|---|
| WO | 2012045184 A1 | 4/2012 |
| WO | 2012100836 | 8/2012 |
| WO | 2012110323 A1 | 8/2012 |
| WO | 2012118367 A1 | 9/2012 |
| WO | 2012120459 A1 | 9/2012 |
| WO | 2012122329 A1 | 9/2012 |
| WO | 2012123857 A1 | 9/2012 |
| WO | 2012144885 A1 | 10/2012 |
| WO | 2013043048 A1 | 3/2013 |
| WO | 2013046014 A1 | 4/2013 |
| WO | 2013053655 A1 | 4/2013 |
| WO | 2013060654 A1 | 5/2013 |
| WO | 2013060918 A1 | 5/2013 |
| WO | 2013068242 A1 | 5/2013 |
| WO | 2013079811 A1 | 6/2013 |
| WO | 2013132435 A1 | 9/2013 |
| WO | 2013135937 A2 | 9/2013 |
| WO | 2013136209 A1 | 9/2013 |
| WO | 2013136240 A1 | 9/2013 |
| WO | 2013144838 A1 | 10/2013 |
| WO | 2013153169 A2 | 10/2013 |
| WO | 2013157924 A1 | 10/2013 |
| WO | 2013157927 A | 10/2013 |
| WO | 2013164669 A1 | 11/2013 |
| WO | 2013189923 A1 | 12/2013 |
| WO | 2013190426 A1 | 12/2013 |
| WO | 2014001584 A1 | 1/2014 |
| WO | 2014012779 A2 | 1/2014 |
| WO | 2014012783 A2 | 1/2014 |
| WO | 2014033344 A1 | 3/2014 |
| WO | 2014053638 A1 | 4/2014 |
| WO | 2014067507 A2 | 5/2014 |
| WO | 2014072942 A2 | 5/2014 |
| WO | 2014076041 A1 | 5/2014 |
| WO | 2014118812 A1 | 8/2014 |
| WO | 2014125390 A1 | 8/2014 |
| WO | 2014128315 A1 | 8/2014 |
| WO | 2014167526 A1 | 10/2014 |
| WO | 2014184651 A1 | 11/2014 |
| WO | 2014184652 A1 | 11/2014 |
| WO | 2014184653 A1 | 11/2014 |
| WO | 2014191412 A1 | 12/2014 |
| WO | 2014191413 A1 | 12/2014 |
| WO | 2014198474 A1 | 12/2014 |
| WO | 2014202105 A1 | 12/2014 |
| WO | 2015011683 A1 | 1/2015 |
| WO | 2015056202 A1 | 4/2015 |
| WO | 2015075584 A1 | 5/2015 |
| WO | 2015082982 A1 | 6/2015 |
| WO | 2015087180 A1 | 6/2015 |
| WO | 2015101394 A1 | 7/2015 |
| WO | 2015104171 A1 | 7/2015 |
| WO | 2015104172 A1 | 7/2015 |
| WO | 2015128527 A1 | 9/2015 |
| WO | 2015128799 A1 | 9/2015 |
| WO | 2015128827 A1 | 9/2015 |
| WO | 2015180960 A1 | 12/2015 |
| WO | 2016041596 A1 | 3/2016 |
| WO | 2016074189 A1 | 5/2016 |
| WO | 2016186488 A1 | 11/2016 |
| WO | 2016186489 A1 | 11/2016 |
| WO | 2016186491 A1 | 11/2016 |
| WO | 2016186492 A1 | 11/2016 |
| WO | 2016186496 A1 | 11/2016 |
| WO | 2017074189 A1 | 5/2017 |

OTHER PUBLICATIONS

International Search Report and Written Opinion, PCT/NL2016/050341, Koninklijke Douwe Egberts B.V., 13 pages (dated Oct. 27, 2016).
International Search Report and Written Opinion, PCT/NL2016/050344, Koninklijke Douwe Egberts B.V., 13 pages (dated Oct. 27, 2016).
International Search Report and Written Opinion, PCT/NL2016/050346, Koninklijke Douwe Egberts B.V., 12 pages (dated Nov. 10, 2016).
International Search Report and Written Opinion, PCT/NL2016/050350, Koninklijke Douwe Egberts B.V., 13 pages(dated Nov. 2, 2016).
International Search Report and Written Opinion, PCT/NL2016/050749, Koninklijke Douwe Egberts B.V., 10 pages (dated Feb. 22, 2017).
International Search Report and Written Opinion, PCT/NL2016/050342, Koninklijke Douwe Egberts B.V., 13 pages(dated Nov. 8, 2016).
International Preliminary Report on Patentability, PCT/NL2016/050341, Koninklijke Douwe Egberts B.V., 8 pages (dated Nov. 21, 2017).
International Preliminary Report on Patentability, PCT/NL2016/050344, Koninklijke Douwe Egberts B.V., 8 pages (dated Nov. 21, 2017).
International Preliminary Report on Patentability, PCT/NL2016/050346, Koninklijke Douwe Egberts B.V., 7 pages (dated Nov. 21 ,2017).
International Preliminary Report on Patentability, PCT/NL2016/050350, Koninklijke Douwe Egberts B.V., 8 pages (dated Nov. 21, 2017).
International Preliminary Report on Patentability, PCT/NL2016/050749, Koninklijke Douwe Egberts B.V., 7 pages (dated May 1, 2018).
International Preliminary Report on Patentability, PCT/NL2016/050342, Koninklijke Douwe Egberts B.V., 8 pages (dated Nov. 21, 2017).
Notice of Opposition, dated Jan. 24, 2020 for EP Application No. 16744560.0, 41 pages.
"Nespresso", Wikipedia Archive, published Nov. 29, 2012, 8 pages.

* cited by examiner

CAPSULE, A SYSTEM FOR PREPARING A POTABLE BEVERAGE FROM SUCH A CAPSULE AND USE OF SUCH A CAPSULE IN A BEVERAGE PREPARATION DEVICE

CROSS-REFERENCE TO RELATED APPLICATIONS

This application is a continuation of International App. No. PCT/NL2016/050349 filed May 13, 2016, which claims the benefit of and priority to International App. No. PCT/NL2015/050352 filed May 15, 2015, International App. No. PCT/NL2015/000018 filed May 15, 2015, International App. No. PCT/NL2015/050349 filed May 15, 2015, International App. No. PCT/NL2015/050611 filed Sep. 3, 2015. The entire contents of all of which are incorporated herein by reference.

BACKGROUND AND SUMMARY

The invention relates to a capsule containing a substance for the preparation of a potable beverage by extracting and/or dissolving the substance by means of supplying a fluid under pressure into the capsule, wherein the capsule comprises an aluminum capsule body having a central capsule body axis, the aluminum capsule body being provided with a bottom, a side wall and an outwardly extending flange, the capsule further comprising an aluminum cover attached to the outwardly extending flange, the cover hermetically closing the capsule, wherein the capsule further comprises a sealing member at the outwardly extending flange for providing a fluid sealing contact with an enclosing member of a beverage preparation device if the capsule is positioned in the enclosing member of the beverage preparation device and the enclosing member is closed by means of a closing member of the beverage preparation device, such as an extraction plate of the beverage preparation device, such that the outwardly extending flange of the capsule and at least a portion of the sealing member of the capsule are sealingly engaged between the enclosing member and the closing member of the beverage preparation device, wherein the enclosing member of the beverage preparation device comprises an annular element having a central annular element axis and a free contact end, the free contact end of the annular element optionally being provided with a plurality of radially extending open grooves.

The invention also relates to a system for preparing a potable beverage from a capsule using a fluid supplied under pressure into the capsule comprising:
  a beverage preparation device comprising an enclosing member for receiving the capsule, wherein the enclosing member comprises fluid injection means for supplying fluid under pressure into the capsule, wherein the beverage preparation device further comprises a closing member, such as an extraction plate, for closing the enclosing member of the beverage preparation device, wherein the enclosing member of the beverage preparation device further comprises an annular element having a central annular element axis and a free contact end, the free contact end of the annular element optionally being provided with a plurality of radially extending open grooves;
  a capsule containing a substance for the preparation of a potable beverage by extracting and/or dissolving the substance by means of the fluid supplied under pressure into the capsule by the fluid injection means of the beverage preparation device, wherein the capsule comprises an aluminum capsule body having a central capsule body axis, the aluminum capsule body being provided with a bottom, a side wall and an outwardly extending flange, the capsule further comprising an aluminum cover attached to the outwardly extending flange, the cover hermetically closing the capsule, wherein the capsule further comprises a sealing member at the outwardly extending flange for providing a fluid sealing contact with the enclosing member of the beverage preparation device if the capsule is positioned in the enclosing member of the beverage preparation device and the enclosing member is closed by means of the closing member of the beverage preparation device, such that the outwardly extending flange of the capsule and at least a portion of the sealing member of the capsule are sealingly engaged between the enclosing member and the closing member of the beverage preparation device.

Furthermore the invention relates to the use of a capsule in a beverage preparation device comprising an enclosing member for receiving the capsule, wherein the enclosing member comprises fluid injection means for supplying fluid under pressure into the capsule, wherein the beverage preparation device further comprises a closing member, such as an extraction plate, for closing the enclosing member of the beverage preparation device, wherein the enclosing member of the beverage preparation device further comprises an annular element having a central annular element axis and a free contact end, the free contact end of the annular element optionally being provided with a plurality of radially extending open grooves; wherein the capsule contains a substance for the preparation of a potable beverage by extracting and/or dissolving the substance by means of the fluid supplied under pressure into the capsule by the fluid injection means of the beverage preparation device, wherein the capsule comprises an aluminum capsule body having a central capsule body axis, the aluminum capsule body being provided with a bottom, a side wall and an outwardly extending flange, the capsule further comprising an aluminum cover attached to the outwardly extending flange, the cover hermetically closing the capsule, wherein the capsule further comprises a sealing member at the outwardly extending flange for providing a fluid sealing contact with the enclosing member of the beverage preparation device if the capsule is positioned in the enclosing member of the beverage preparation device and the enclosing member is closed by means of the closing member of the beverage preparation device, such that the outwardly extending flange of the capsule and at least a portion of the sealing member of the capsule are sealingly engaged between the enclosing member and the closing member of the beverage preparation device.

Such a capsule, system and use are known from EP-B-1 700 548. In the known system the capsule is provided with a sealing member having the shape of a step, i.e. a sudden increase of the diameter of the side wall of the capsule, and the enclosing member of this known system has a sealing surface acting on the sealing member to provide deflection of the sealing member, the sealing surface being inclined so that the deflection of the sealing member is an inwards and downwards deformation of the step. Furthermore in the known system the enclosing member comprises a capsule holder and a manually operated or an automatic mechanism for relative displacement of the enclosing member and the capsule holder. The manually operated or an automatic mechanism applies a force on the sealing member of the capsule when the enclosing member closes on the capsule holder. This force should ensure the fluid tight seal between the enclosing member and the capsule. Because the manually operated or an automatic mechanism is arranged to be moved relative to the base, the sealing capabilities of the system can depend on the pressure of the fluid injected by the fluid injection means. If the pressure of the fluid increases, the force between the sealing member of the capsule and the free end of the enclosing member increases too and thereby the force between the sealing member of the capsule and the free end of the enclosing member increases also. Such a system is described further on. The sealing member of the capsule must be arranged such that upon reaching the maximum fluid pressure in the enclosing member the sealing member should still provide a fluid sealing contact between the enclosing member and the capsule. However, the sealing member must also be arranged such that prior to, or at the start of, brewing when the pressure of the fluid in the enclosing member outside the capsule is relatively low, the sealing member also provides a fluid sealing contact between the enclosing member and the capsule. If at the start of brewing, there would not exist a fluid sealing contact between the capsule and the enclosing member, leakage will occur. However, if leakage occurs there is a real chance that the pressure in the enclosing member and outside the capsule will not sufficiently increase for increasing the force on the sealing member by means of the free end of the enclosing member if the manually operated or an automatic mechanism moves the enclosing member towards the capsule holder. Only if there is a sufficient initial sealing, the pressure in the enclosing member will increase whereby also the force of the free end of the enclosing member acting on the sealing member of the capsule will increase for providing a sufficient fluid sealing contact at also the increased fluid pressure. Moreover, this increased fluid pressure outside the capsule also provides an increased fluid pressure inside the capsule which is essential if the capsule is provided with a cover which is arranged to tear open on relief members of the capsule holder (also called an extraction plate) of the beverage preparation device under the influence of fluid pressure in the capsule.

It follows from the above that the sealing member is a member which is very critical in design. It should be able to provide a fluid sealing contact between the enclosing member and the capsule at a relatively low fluid pressure if only a relatively small force is applied on the sealing member by means of the free end of the enclosing member but it should also provide a fluid sealing contact at a much higher fluid pressure in the enclosing member outside the capsule if a higher force is applied by means of the free end of the enclosing member to the sealing member of the capsule. In particular when the free contact end of the enclosing member is provided with radially extending open grooves which act as air inlet passage once the force between the enclosing member and the capsule holder is released so that it is easier for a user to take out the capsule, the sealing member must also be able to 'close' the radially extending open grooves to provide an effective seal.

It is an object of the invention to provide an alternative sealing member which is relatively easy to manufacture, which is environmentally friendly if the capsule is disposed of after use and/or which provides a satisfactory sealing both at a relatively low fluid pressure if only a relatively small force is applied on the sealing member by means of the free end of the enclosing member (sometimes also called initial seal) and at a much higher fluid pressure if a higher force is applied (e.g. during brewing) by means of the free end of the enclosing member to the sealing member of the capsule, even in case of an enclosing member of which the free contact end is provided with radially extending open grooves.

The invention has also as an object to provide an alternative system for preparing a potable beverage from a capsule and to provide an alternative use of a capsule in a beverage preparation device.

In accordance with the invention there is provided in a first aspect a capsule containing a substance for the preparation of a potable beverage by extracting and/or dissolving the substance by means of supplying a fluid under pressure into the capsule, wherein the capsule comprises an aluminum capsule body having a central capsule body axis, the aluminum capsule body being provided with a bottom, a side wall and an outwardly extending flange, the capsule further comprising an aluminum cover attached to the outwardly extending flange, the cover hermetically closing the capsule, wherein the capsule further comprises a sealing member at the outwardly extending flange for providing a fluid sealing contact with an enclosing member of a beverage preparation device if the capsule is positioned in the enclosing member of the beverage preparation device and the enclosing member is closed by means of a closing member of the beverage preparation device, such as an extraction plate of the beverage preparation device, such that the outwardly extending flange of the capsule and at least a portion of the sealing member of the capsule are sealingly engaged between the enclosing member and the closing member of the beverage preparation device, wherein the enclosing member of the beverage preparation device comprises an annular element having a central annular element axis and a free contact end, the free contact end of the annular element optionally being provided with a plurality of radially extending open grooves, characterized in that, the sealing member is integral with the outwardly extending flange and comprises at least one projection projecting from the outwardly extending flange, the at least one projection comprising a projection top, and wherein the at least one projection is configured such that its projection top exerts a radial force on the free contact end of the annular element if the capsule is positioned in the enclosing member of the beverage preparation device and the enclosing member is closed by means of a closing member of the beverage preparation device. Since the sealing member is integral with the outwardly extending flange and comprises at least one projection of which the top exerts a radial force on the free contact end of the annular element if the capsule is positioned in the enclosing member of the beverage preparation device and the enclosing member is closed by means of a closing member of the beverage preparation device a satisfactory sealing can be obtained. Such a sealing member is relatively easy to manufacture. Furthermore the capsule can provide a satisfactory sealing with the free contact end provided with radially extending open grooves. In addition the sealing facilitates positioning of the capsule inside the beverage preparation device.

In this application the existence of a fluid sealing contact means that 0-6%, preferably 0-4%, more preferably 0-2.5% of the total fluid supplied to the enclosing member for preparing the beverage may leak away due to leakage between the free contact end and the sealing member of the capsule.

The invention is in particular advantageous when in an embodiment of a capsule the capsule contains an extractable product as substance for the preparation of a potable beverage, the extractable product preferably being 5-20 grams, preferably 5-10 grams, more preferably 5-7 grams of an extractable product, such as roasted and ground coffee.

In an embodiment of a capsule according to the invention which is in particular easy to manufacture the outer diameter of the outwardly extending flange of the capsule is larger than the diameter of the bottom of the capsule. Preferably, the outer diameter of the outwardly extending flange is approximately 37.1 mm and the diameter of the bottom of the capsule is about 23.3 mm.

The invention is in particular advantageous when in an embodiment of a capsule the thickness of the aluminum capsule body is such that it is deformed easily if the capsule is positioned in the enclosing member of the beverage preparation device and the enclosing member is closed by means of a closing member of the beverage preparation device, preferably the thickness of the aluminum capsule body is 20 to 200 micrometer, preferably 100 micrometer.

The invention is in particular advantageous when in an embodiment of a capsule the thickness of the aluminum cover is 15 to 65 micrometer, preferably 30-45 micrometer and more preferably 39 micrometer.

In an embodiment of a capsule according to the invention the wall thickness of the aluminum cover is smaller than the wall thickness of the aluminum capsule body.

In a further embodiment of a capsule according to the invention the aluminum cover is arranged to tear open on a closing member of the beverage preparation device, such as an extraction plate of the beverage preparation device under the influence of fluid pressure in the capsule.

In an embodiment of a capsule according to the invention which is in particular easy to manufacture the side wall of the aluminum capsule body has a free end opposite the bottom, the outwardly extending flange extending from the free end of the side wall in a direction at least substantially transverse to the central capsule body axis. Preferably, the outwardly extending flange comprises a curled outer edge, which is beneficial in obtaining for a satisfactory sealing with the free contact end provided with radially extending open grooves. The radius about the central capsule body axis of an inner edge of the curled outer edge of the outwardly extending flange is preferably at least 32 mm, so that clearance from the annular end surface of the enclosure member is ensured. It is then preferred that the sealing member is positioned between the free end of the side wall of the aluminum capsule body and an inner edge of the curled outer edge of the outwardly extending flange to obtain a still further satisfactory sealing.

To ensure that the curled outer edge does not interfere with operation of a wide variety of commercially available and future beverage preparation apparatuses, the curled outer edge of the outwardly extending flange has a largest dimension of about 1.2 millimeter.

The invention is in particular beneficial for capsules of which the inner diameter of the free end of the side wall of the aluminum capsule body is about 29.5 mm. The distance between the free end of the side wall of the aluminum capsule body and an outermost edge of the outwardly extending flange can be about 3.8 millimeter. The preferred height of the aluminum capsule body is about 28.4 mm.

In an embodiment of a capsule according to the invention which after use is easier for a user to take out of a beverage preparation device the aluminum capsule body is truncated, wherein preferably the side wall of the aluminum capsule body encloses an angle with a line transverse to the central capsule body axis of about 97.5°.

In an advantageous embodiment of a capsule according to the invention the bottom of the aluminum capsule body has a largest inner diameter of about 23.3 mm. It is preferred that the bottom of the aluminum capsule body is truncated, preferably having a bottom height of about 4.0 mm and that the bottom further has a generally flat central portion opposite the cover having a diameter of about 8.3 mm.

In practically all cases a satisfactory seal can be obtained in an embodiment of a capsule according to the invention in which the height of the sealing member portion to be contacted first by the free end of the enclosure member when the enclosure member is closed is at least about 0.1 mm, more preferably at least 0.2 mm and most preferably at least 0.8 mm and at most 3 mm, more preferably at most 2 mm and most preferably at most 1.2 mm.

In a preferred embodiment of a capsule according to the invention the capsule comprises an inner surface, and wherein on the inner surface of at least the side wall of the capsule an inner coating is provided. In particular when the capsule is manufactured by deep drawing the inner coating facilitates the deep drawing process. In case the aluminum cover of the capsule is attached to the outwardly extending flange by means of a sealing lacquer it is then in particular advantageous when the inner coating being composed of the same material as the sealing lacquer. In dependence of the inner coating used it is preferred that the sealing member is free from an inner coating in order to prevent crumbling off of the inner coating from the sealing member.

In a further embodiment of a capsule according to the invention the capsule comprises an outer surface, wherein on the outer surface of the capsule a color lacquer is provided. In order to facilitate in deep drawing it is preferred to provide on an outer surface of the color lacquer an outer coating. In dependence of the color lacquer and outer coating used it is preferred that the sealing member is free from a color lacquer (and consequently the outer coating) in order to prevent crumbling off of the color lacquer/outer coating from the sealing member.

In a still further embodiment of a capsule according to the invention the at least one projection comprises a projection side wall which is inclined with regard to the outwardly extending flange of the aluminum capsule body, the projection side wall being configured such that it is deformed easily if the capsule is positioned in the enclosing member of the beverage preparation device and the enclosing member is closed by means of a closing member of the beverage preparation device. This improves the force exerted on the free contact end and thus improves the sealing. It is then preferred when the distance between the projection and the side wall of the aluminum capsule body is such that the free contact end of the annular element is contacted by the projection and the side wall of the aluminum capsule body if the capsule is positioned in the enclosing member of the beverage preparation device and the enclosing member is closed by means of a closing member of the beverage preparation device.

In an advantageous embodiment of a capsule according to the invention the sealing member in addition to the at least one projection projecting from the outwardly extending flange comprises a plateau between the projection top and the side wall of the aluminum capsule body. It is beneficial for providing a seal when a bearing is formed by the projection, plateau and the side wall of the aluminum capsule body, wherein the distance between the projection and the side wall is such that the free contact end of the annular element is enclosed by the projection and the side wall of the aluminum capsule body if the capsule is positioned in the enclosing member of the beverage preparation device and the enclosing member is closed by means of a closing member of the beverage preparation device.

The projection, the side wall of the aluminum capsule body and the plateau can be arranged such that the free contact end of the annular element is contacted by the plateau if the capsule is positioned in the enclosing member of the beverage preparation device and the enclosing member is closed by means of a closing member of the beverage preparation device.

Alternatively the sealing member can comprises two spaced projections, each projecting from the outwardly extending flange and a plateau between the two projections, wherein the distance between the two projections is such that the free contact end of the annular element is squeezed between converging surfaces of the two projections if the capsule is positioned in the enclosing member of the beverage preparation device and the enclosing member is closed by means of a closing member of the beverage preparation device. It is then preferred when the distance between the two projections is such that the free contact end of the annular element is contacted by the two projections if the capsule is positioned in the enclosing member of the beverage preparation device and the enclosing member is closed by means of a closing member of the beverage preparation device. In particular a satisfactory seal can be obtained when the two spaced projections and the plateau are arranged such that the free contact end of the annular element is contacted by the plateau if the capsule is positioned in the enclosing member of the beverage preparation device and the enclosing member is closed by means of a closing member of the beverage preparation device. The capsule can preferably comprise a bearing for the enclosing member of the beverage preparation device if the capsule is positioned in the enclosing member of the beverage preparation device and the enclosing member is closed by means of a closing member of the beverage preparation device, the bearing enclosing at least a portion of the free contact end of the annular element and the bearing being formed by the two projections and the plateau there between.

The plateau can be substantially flat or can comprise a curved portion. In particular advantageous is the embodiment of a capsule according to the invention in which the plateau is V-shaped. In this manner the free contact end of the annular member is squeezed between the two projections providing a satisfactory seal.

To achieve sequential low and high pressure sealings against inner and outer circumferential surface portions of the free end of the enclosing member, a first one of the two projections may project further from a base portion of the outwardly extending flange, to which base portion the cover is attached, than a second one of the two projections.

Additionally or alternatively, the first one of the two projections may have a first sloping side surface one a side facing the second one of the two projections and the second one of the two projections may have a second sloping side surface on a side facing the first one of the two projections, the first side surface having a greater size from its top end to its lower end than the second side surface.

For the same purpose, it may moreover or alternatively be provided that the first one of the two projections has a first conical sloping side surface one a side facing the second one of the two projections and the second one of the two projections has a second sloping side surface on a side facing the first one of the two projections, the first side surface having a conical generatrix at a first enclosed angle relative to the cover, the second side surface having a conical generatrix at a second enclosed angle relative to the cover, the first angle being smaller than the second angle.

For achieving such sequential low and high pressure sealings against inner and outer circumferential surface portions of the free end of the enclosing member, it is also advantageous if a first one of the two projections has an extreme top end extending around the capsule axis at a diameter of 31.8 to 32.0 mm and preferably 31.9 mm and the second one of the two projections has an extreme top end extending around the capsule axis at a diameter of 29.7 to 30.0 mm and preferably 29.8 mm. Thus, when used in commercially available coffee making apparatuses such as the Citiz, Lattisima, U, Maestria, Pixie, Inissia and Essenza, an outer edge area of the free end of the enclosing member contacts the outer one of the two projections at a first distance from its extreme top end and an inner edge area of the free end of the enclosing member contacts the inner one of the two projections at a second distance from its extreme top end, the first distance being larger than the second distance, so that the first projection deforms more easily providing the low pressure seal, while the second projection exerts more counter pressure while deforming and provides the high pressure seal. The higher average counter pressure exerted by the second projection is also advantageous for achieving an accommodation to the relatively deep recesses in the inner edge area of the free end of the enclosing member that is sufficient to achieve a satisfactory high pressure seal.

Preferably, the first one of the two projections is the outer one of the two projections. The capsule is then particularly suitable for use commercially available apparatuses such as the Citiz, Lattisima, U, Maestria, Pixie, Inissia and Essenza in which the free contact end of the annular element is provided with the plurality of radially extending open grooves, the grooves being deeper in the outer surface portion than in the inner surface portion or the grooves are absent in the inner surface portion.

If the plateau is axially spaced from the cover, this area between the first and second projections is displaced axially towards the cover as the enclosing member is closed by means of the closing member of the beverage preparation device. This causes the first projection and the second projection to deform towards the free contact end of the annular element, due to tilting and "rolling off" of the first projection and the second projection, thereby increasing the radial contact pressure exerted against the free contact end of the annular element, which contributes to achieving a satisfactory seal.

In accordance with the invention there is provided in a second aspect a system for preparing a potable beverage from a capsule using a fluid supplied under pressure into the capsule comprising:

a beverage preparation device comprising an enclosing member for receiving the capsule, wherein the enclosing member comprises fluid injection means for supplying fluid under pressure into the capsule, wherein the beverage preparation device further comprises a closing member, such as an extraction plate, for closing the enclosing member of the beverage preparation device, wherein the enclosing member of the beverage preparation device further comprises an annular element having a central annular element axis and a free contact end, the free contact end of the annular element optionally being provided with a plurality of radially extending open grooves;

a capsule containing a substance for the preparation of a potable beverage by extracting and/or dissolving the substance by means of the fluid supplied under pressure into the capsule by the fluid injection means of the beverage preparation device, wherein the capsule comprises an aluminum capsule body having a central capsule body axis, the aluminum capsule body being provided with a bottom, a side wall and an outwardly extending flange, the capsule further comprising an aluminum cover attached to the outwardly extending flange, the cover hermetically closing the capsule, wherein the capsule further comprises a sealing member at the outwardly extending flange for providing a fluid sealing contact with the enclosing member of the beverage preparation device if the capsule is positioned in the enclosing member of the beverage preparation device and the enclosing member is closed by means of the closing member of the beverage preparation device, such that the outwardly extending flange of the capsule and at least a portion of the sealing member of the capsule are sealingly engaged between the enclosing member and the closing member of the beverage preparation device, characterized in that, the sealing member is integral with the outwardly extending flange and comprises at least one projection projecting from the outwardly extending flange, the at least one projection comprising a projection top, and wherein the at least one projection is configured such that its projection top exerts a radial force on the free contact end of the annular element if the capsule is positioned in the enclosing member of the beverage preparation device and the enclosing member is closed by means of a closing member of the beverage preparation device.

Since the sealing member is integral with the outwardly extending flange and comprises at least one projection of which the top exerts a radial force on the free contact end of the annular element if the capsule is positioned in the enclosing member of the beverage preparation device and the enclosing member is closed by means of a closing member of the beverage preparation device a satisfactory sealing can be obtained. Such a sealing member is relatively easy to manufacture. Furthermore the capsule can provide a satisfactory sealing with the free contact end provided with radially extending open grooves.

The projection or projections may project from at least one base portion of the flange to which base portion the cover is attached. The projection or projections may project axially from the base portion in a direction away from the cover. The projection top may constitute a portion of the projection, for instance a half, a third or a quarter of the projection, that is axially most distal from the base portion.

Regarding the preferred embodiments of the system as mentioned in the dependent claims which relate to the same features as the features of the dependent claims of the capsule reference is made to the above.

The invention is particularly suitable in a system according to the invention wherein, in use, the maximum fluid pressure in the enclosing member of the beverage preparation device is in the range of 6-20 bar, preferably between 12 and 18 bar. Even at such high pressures a satisfactory seal between capsule and beverage preparation device can be obtained.

Preferably the system is arranged such that, in use, during brewing, a free end of the enclosing member of the beverage preparation device exerts a force F2 on the sealing member of the capsule to provide a fluid sealing contact between the outwardly extending flange of the capsule and the enclosing member of the beverage preparation device, wherein F2 is in the range of 500-1500 N preferably in the range of 750-1250 N when the fluid pressure P2 in the enclosing member of the beverage preparation device outside the capsule is in the range of 6-20 bar, preferably between 12 and 18 bar. In particular the system is arranged such that, in use, prior to or at the start of brewing, a free end of the enclosing member of the beverage preparation device exerts a force F1 on the sealing member of the capsule to provide a fluid sealing contact between the outwardly extending flange of the capsule and the enclosing member of the beverage preparation device, wherein F1 is in the range of 30-150 N preferably in the range of 40-150 N, more preferably 50-100 N, when the fluid pressure P1 in the enclosing member of the beverage preparation device outside the capsule is in the range of 0.1-4 bar, preferably between 0.1-1 bar.

In an embodiment of a system according to the invention wherein the plurality of radially extending open grooves are uniformly spaced relative to each other in tangential direction of the free contact end of the annular element of the beverage preparation device so that it is easier for a user to take out the capsule while a satisfactory seal between capsule and beverage preparation device can still be provided.

In an advantageous embodiment of a system according to the invention the longest tangential width of each groove (top to top, i.e. equal to the groove to groove pitch) is 0.9-1.1 mm, preferably 0.95 to 1.05 mm, more preferably 0.98 to 1.02 mm, wherein a maximal height of each groove in an axial direction of the enclosing member of the beverage preparation device is 0.01-0.09 mm, preferably 0.03 to 0.07 mm, more preferably 0.045 to 0.055 mm, most preferred 0.05 mm and wherein the number of grooves is 90 to 110, preferably 96. The radial width of the annular end surface at the location of the grooves may for instance be 0.05-0.9 mm, preferably 0.2-0.7 mm and more preferably 0.3-0.55 mm. The invention is in particular suitable when applied to an embodiment of a system according to the invention in which during use when the closing member of the beverage preparation device closes the enclosing member of the beverage preparation device at least the free contact end of the enclosing member of the beverage preparation device can move relative to the closing member of the beverage preparation device under the effect of the pressure of the fluid in the enclosing member of the beverage preparation device towards the closing member of the beverage preparation device for applying the maximum force between the flange of the capsule and the free end of the enclosing member of the beverage preparation device. The enclosing member may comprise a first part and a second part wherein the second part comprises the free contact end of the enclosing member wherein the second part can move relative to the first part between a first and second position. The second part can move from the first position towards the second position in the direction of the closing member under the influence of fluid pressure in the enclosing member. The force F1 as discussed above may be reached if the second part is in the first position with a fluid pressure P1. The force F2 as discussed above may be reached if the second part is moved towards the second position under the influence of the fluid pressure P2 in the enclosing member.

In accordance with the invention there is provided in a third aspect a use of a capsule according to the invention in a beverage preparation device comprising an enclosing member for receiving the capsule, wherein the enclosing member comprises fluid injection means for supplying fluid under pressure into the capsule, wherein the beverage preparation device further comprises a closing member, such as an extraction plate, for closing the enclosing member of the beverage preparation device, wherein the enclosing member of the beverage preparation device further comprises an annular element having a central annular element axis and a free contact end, the free contact end of the annular element optionally being provided with a plurality of radial grooves; wherein the capsule contains a substance for the preparation of a potable beverage by extracting and/or dissolving the substance by means of the fluid supplied under pressure into the capsule by the fluid injection means of the beverage preparation device, wherein the capsule comprises an aluminum capsule body having a central capsule body axis, the aluminum capsule body being provided with a bottom, a side wall and an outwardly extending flange, the capsule further comprising an aluminum cover attached to the outwardly extending flange, the cover hermetically closing the capsule, wherein the capsule further comprises a sealing member integral with the outwardly extending flange for providing a fluid sealing contact with the enclosing member of the beverage preparation device if the capsule is positioned in the enclosing member of the beverage preparation device and the enclosing member is closed by means of the closing member of the beverage preparation device, such that the outwardly extending flange of the capsule and at least a portion of the sealing member of the capsule are sealingly engaged between the enclosing member and the closing member of the beverage preparation device. Regarding the advantage of the inventive use and the preferred embodiments of the use as mentioned in the dependent claims which relate to the same features as the features of the dependent claims of the capsule or the dependent claims of the system reference is made to the above.

BRIEF DESCRIPTION OF THE DRAWINGS

The invention will now be further elucidated by means of, non-limiting, examples referring to the drawing, in which.

In the Figures and the following description, like reference numerals refer to like features.

DETAILED DESCRIPTION

Figure 1:
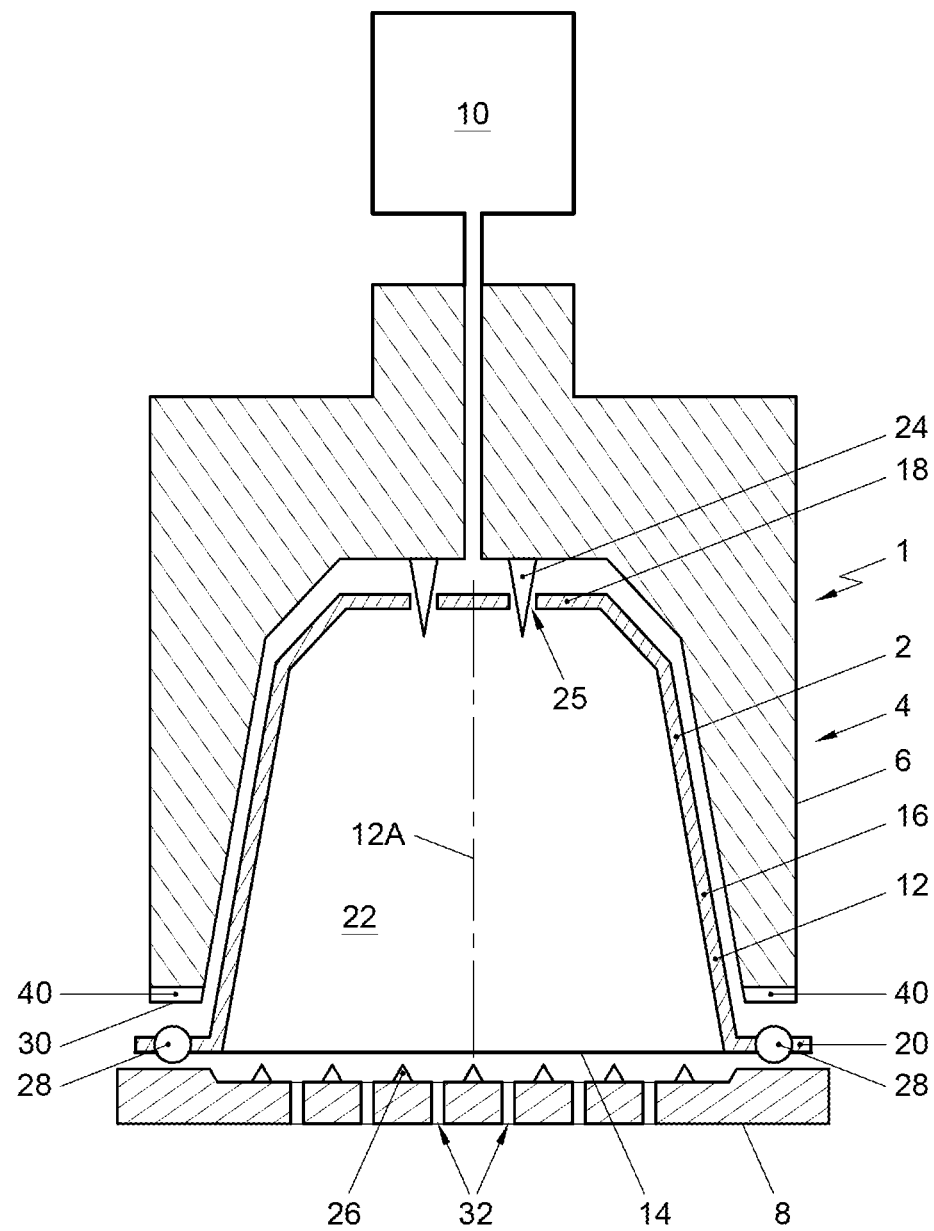
FIG. 1 shows a schematic representation of an embodiment of a system according to the invention.

FIG. 1 shows a schematic representation, in cross sectional view, of an embodiment of a system 1 for preparing a potable beverage from a capsule using a fluid supplied under pressure into the capsule. The system 1 comprises a capsule 2, and a beverage preparation device 4. The device 4 comprises enclosing member 6 for holding the capsule 2. The device 4 further comprises a closing member, such as an extraction plate, 8 for supporting the capsule 2.

In FIG. 1 a gap is drawn between the capsule 2, the enclosing member 6 and the extraction plate 8 for clarity. It will be appreciated that, in use, the capsule 2 may lie in contact with the enclosing member 6 and the extraction plate member 8. Commonly, the enclosing member 6 has a shape complementary to the shape of the capsule 2. The beverage preparation device 4 further comprises a fluid injection means 10 for supplying an amount of a fluid, such as water, under a pressure in the range of 6-20 bar, preferably between 12 and 18 bar, to the exchangeable capsule 2.

In the example shown in FIG. 1, the exchangeable capsule 2 comprises an aluminum capsule body 12 having a central capsule body axis 12A and an aluminum cover 14. In the present context, the meaning of 'aluminum' is understood to also include aluminum alloy. In this example, the aluminum capsule body 12 comprises a side wall 16, a bottom 18 closing the side wall 16 at a first end, and a outwardly extending flange 20 extending outwardly of the circumferential wall 16 at a second end opposite the bottom 18. The side wall 16, the bottom 18 and the cover 14 enclose an inner space 22 comprising a substance for the preparation of a potable beverage by extracting and/or dissolving the substance. Preferably the substance is an extractable product for the preparation of a potable beverage, the extractable product preferably being 5-20 grams, preferably 5-10 grams, more preferably 5-7 grams of roasted and ground coffee for the preparation of a single beverage. The capsule is initially sealed, i.e. is hermetically closed prior to use.

The system 1 of FIG. 1 comprises bottom piercing means 24 for piercing the bottom 18 of the capsule 2 for creating at least one entrance opening 25 in the bottom 18 for supplying the fluid to the extractable product through the entrance opening 25.

The system 1 of FIG. 1 further comprises cover piercing means 26, here embodied as protrusions of the closing member 8, for piercing the cover 14 of the capsule 2. The cover piercing means 26 may be arranged to tear the cover 14 once a (fluid) pressure inside the inner space 22 exceeds a threshold pressure and presses the cover 14 against the cover piercing means 26 with sufficient force. The aluminum cover 14 thus is arranged to tear open on the closing member 8 of the beverage preparation device under the influence of fluid pressure in the capsule.

Figure 3A:
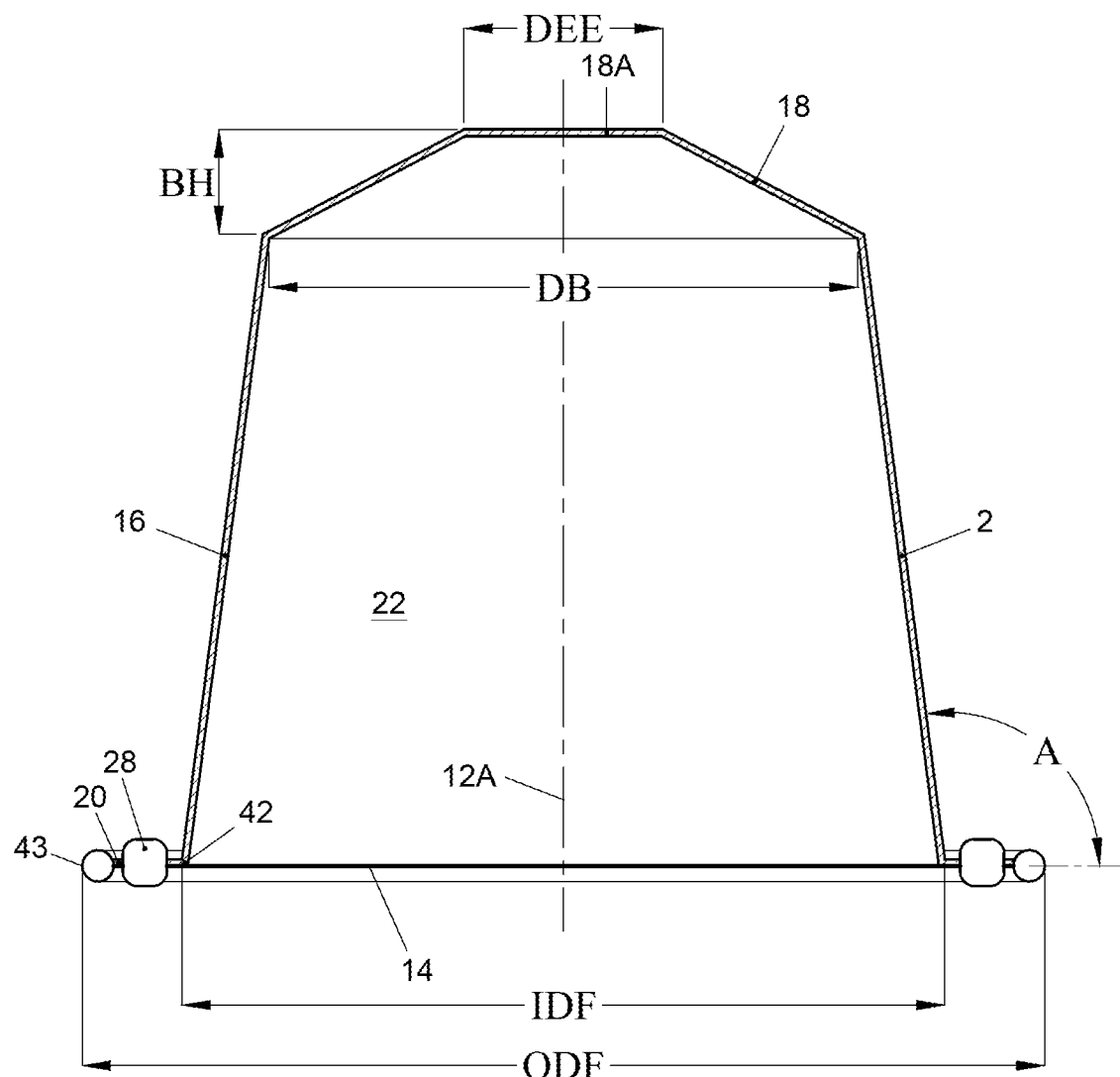
FIG. 3A in cross section shows an embodiment of a capsule according to the invention before use.
Figure 3B:
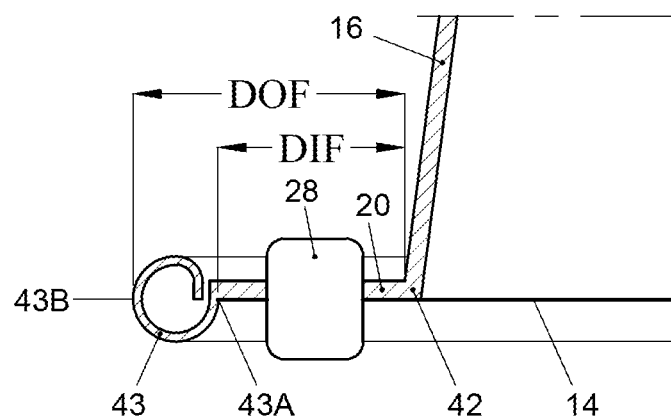
FIG. 3B shows an enlarged detail of a the capsule of FIG. 3A showing the outwardly extending flange and the sealing member.

The capsule 2 further comprises a sealing member 28 integral with the outwardly extending flange, in FIGS. 1, 3A and 3B indicated as a general box but more detailed described with regard to FIG. 4, which sealing member 28 is arranged for providing a fluid sealing contact with the enclosing member 6 if the capsule 2 is positioned in the enclosing member 6 and the enclosing member 6 is closed by means of the extraction plate 8, such that the outwardly extending flange 20 of the capsule 2 and at least a portion of the sealing member 28 are sealingly engaged between the enclosing member 6 and the extraction plate 8. This means that a fluid sealing contact between the sealing member and the free contact end is established.

Figure 2:
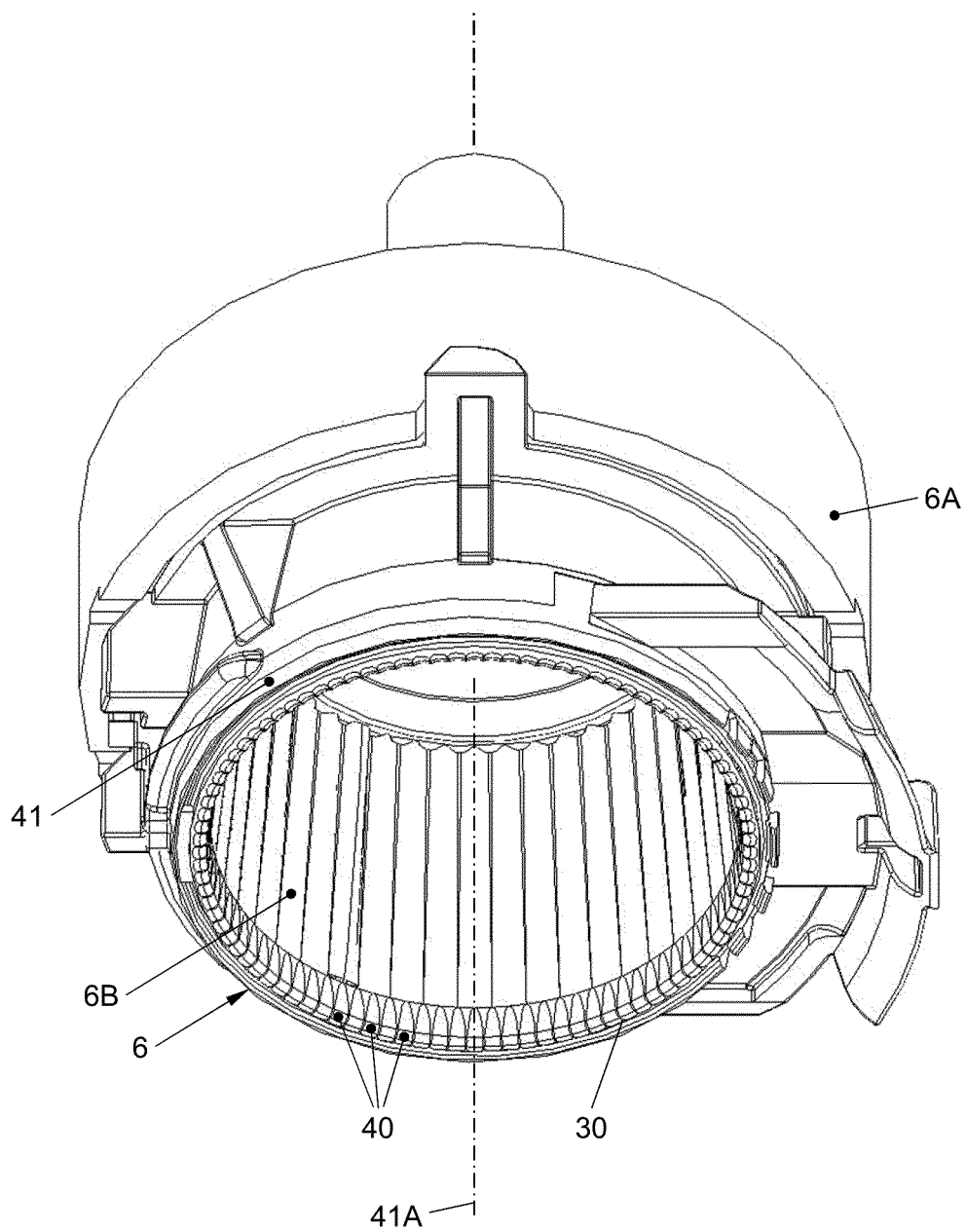
FIG. 2 in a perspective view shows an embodiment of a beverage preparation device of a system according to the invention showing the free contact end of the enclosing member of the beverage preparation device with the plurality of radially extending open grooves.

As shown in FIG. 2 the enclosing member 6 of the beverage preparation device comprises an annular element 41 having a central annular element axis 41A and a free contact end 30. The free contact end 30 of the annular element 41 is provided with a plurality of radially extending open grooves 40. The plurality of radially extending open grooves 40 are uniformly spaced relative to each other in tangential direction of the free contact end 30 of the annular element 41. The longest tangential width of each groove 40 is 0.9-1.1 mm, preferably 0.95 to 1.05 mm, more preferably 0.98 to 1.02 mm, wherein a maximal height of each groove 40 in an axial direction of the enclosing member 6 is 0.01-0.09 mm, preferably 0.03 to 0.07 mm, more preferably 0.045 to 0.055 mm, and most preferred 0.05 mm. The number of grooves 40 lies in the range of 90 to 110, preferably 96. Usually, the radial width of the free end at the location of the grooves is 0.05-0.9 mm, more specifically 0.2-0.7 mm, more specifically 0.3-0.55 mm.

An embodiment of a capsule according to the invention is shown more detailed in FIGS. 3A and 3B. In the shown embodiment the outer diameter ODF of the outwardly extending flange 20 is larger than the diameter DB of the bottom 18 of the capsule 2. In the shown embodiment the outer diameter ODF of the outwardly extending flange 20 is approximately 37.1 mm and the diameter DB of the bottom 18 is about 23.3 mm. The thickness of the aluminum capsule body 12 is such that it is deformed easily if the capsule is positioned in the enclosing member of the beverage preparation device and the enclosing member is closed by means of a closing member of the beverage preparation device, preferably the thickness of the aluminum capsule body is 100 micrometer, but in other embodiments the thickness can be 20 to 200 micrometer.

In the shown embodiment, the wall thickness of the aluminum cover 14 is 39 micrometer. The wall thickness of the aluminum cover 14 is preferably smaller than the thickness of the aluminum capsule body 12.

The side wall 16 of the aluminum capsule body 12 has a free end 42 opposite the bottom 18. The inner diameter IDF of the free end 42 of the side wall 16 of the aluminum capsule body 12 is about 29.5 mm. The outwardly extending flange 20 extends from that free end 42 in a direction at least substantially transverse to the central capsule body axis 12A. The outwardly extending flange 20 comprises a curled outer edge 43 which is beneficial for obtaining a seal between the capsule and the enclosing member. In the shown embodiment the curled outer edge 43 of the outwardly extending flange 20 has a largest dimension of about 1.2 millimeter. The distance DIF between the free end 42 of the side wall 16 of the aluminum capsule body 12 and an inner edge 43A of the curled outer edge 43 is about 2.7 mm, while the distance DOF between the free end 42 of the side wall 16 of the aluminum capsule body 12 and an outermost edge 43B of the outwardly extending flange 20 is about 3.8 millimeter. The radius about the central capsule body axis of the inner edge 43A of the curled outer edge 43 is preferably at least 32 mm.

As shown in FIGS. 3A and 3B the sealing member 28 is positioned between the free end of the side wall 16 of the aluminum capsule body 12 and the inner edge 43A of the curled outer edge 42 of the outwardly extending flange. The sealing member 28 is indicated as a general box, but will be described in more detail below. Irrespective of the embodiment of the sealing member 28 the height of the sealing member portion to be contacted first by the free end of the enclosure member when the enclosure member is closed is at least about 0.1 mm, more preferably at least 0.2 mm and most preferably at least 0.8 mm and at most 3 mm, more preferably at most 2 mm and most preferably at most 1.2 mm for providing a correct seal.

As can be seen from FIG. 3A the aluminum capsule body 12 is truncated. In the embodiment shown, the side wall 16 of the aluminum capsule body 12 encloses an angle A with a line transverse to the central capsule body axis 12A of about 97.5°. The bottom 18 of the aluminum capsule body 12 has a largest inner diameter DB of about 23.3 mm. The bottom 18 of the aluminum capsule body 12 is also truncated, and in the shown embodiment has a bottom height BH of about 4.0 mm. The bottom 18 further has a generally flat central portion 18A opposite the cover 14, which central portion 18A has a diameter DEE of about 8.3 mm and in which central portion 18A the entrance opening(s) 25 may be made. The entrance openings may also be made in the truncated portion between the central portion 18A and the side wall 16. The total height TH of the aluminum capsule body 12 of the capsule is about 28.4 mm.

The system 1 shown in FIG. 1 is operated as follows for preparing a cup of a potable beverage, in the present example coffee, wherein the substance is roasted and ground coffee.

The capsule 2 is placed in the enclosing member 6. The extraction plate 8 is brought into contact with the capsule 2. The bottom piercing means 24 pierce the bottom 18 of the capsule 2 for creating the entrance openings 25. The fluid, here hot water under pressure, is supplied to the extractable product in the inner space 22 through the entrance openings 25. The water will wet the coffee grounds and extract the desired substances to form the coffee beverage.

During supplying the water under pressure to the inner space 22, the pressure inside the capsule 2 will rise. The rise in pressure will cause the cover 14 to deform and be pressed against the lid piercing means 26 of the extraction plate. Once the pressure reaches a certain level, the tear strength of the cover 14 will be surpassed and the cover 14 will rupture against the lid piercing means 26, creating exit openings. The prepared coffee will drain from the capsule 2 through the exit openings and outlets 32 (see FIG. 1) of the extraction plate 8, and may be supplied to a container such as a cup (not shown).

The system 1 is arranged such that prior to or at the start of brewing, the free end 30 of the enclosing member 6 exerts a force F1 on the sealing member 28 of the capsule 2 to provide a fluid sealing contact between the outwardly extending flange 20 of the capsule 2 and the enclosing member 6 of the beverage preparation device, wherein F1 is in the range of 30-150 N preferably 40-150 N, more preferably 50-100 N, when the fluid pressure P1 in the enclosing member of the beverage preparation device outside the capsule is in the range of 0.1-4 bar, preferably 0.1-1 bar. During brewing, the free end 30 of the enclosing member 6 exerts a force F2 on the sealing member 28 of the capsule 2 to provide a fluid sealing contact between the outwardly extending flange 20 of the capsule 2 and the enclosing member 6, wherein the force F2 is in the range of 500-1500 N, preferably in the range of 750-1250 N, when the fluid pressure P2 in the enclosing member 6 of the beverage preparation device outside the capsule 2 is in the range of 6-20 bar, preferably between 12 and 18 bar. In the shown embodiment the free contact end of enclosing member 6 can move relative to the extracting plate 8 under the effect of the pressure of the fluid in the enclosing member 6 device towards the extraction plate 8 for applying the maximum force F2 between the outwardly extending flange 20 and the free end 30 of the enclosing member 6. This movement can take place during use, i.e. in particular at the start of brewing and during brewing. The enclosing member 6 has a first part 6A and a second part 6B wherein the second part comprises the free contact end 30. The second part 6B can move relative to the first part 6A between a first and second position. The second part 6B can move from the first position towards the second position in the direction of the closing member 8 under the influence of fluid pressure in the enclosing member 6. The force F1 as discussed above may be reached if the second part 6B is in the first position with a fluid pressure P1. The force F2 as discussed above may be reached if the second part 6B is moved towards the second position under the influence of the fluid pressure P2 in the enclosing member 6.

Figure 3C:
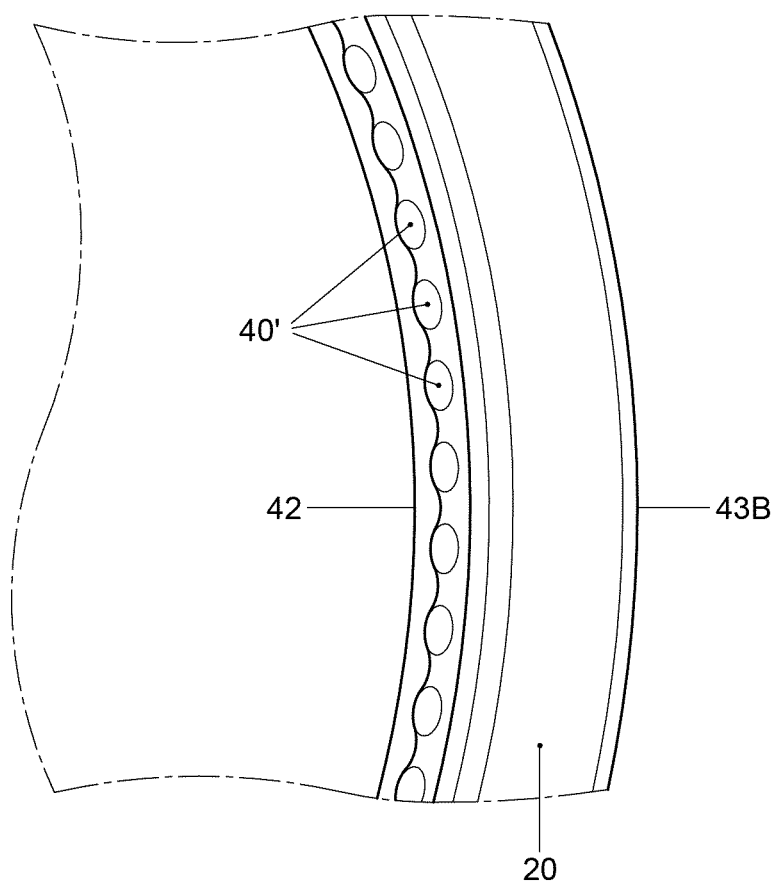
FIG. 3C shows an enlarged detail of the outwardly extending flange of the capsule in FIGS. 3A and 3B after use.

As a result of the force applied the sealing member 28 of the capsule according to the invention undergoes a plastic deformation and closely conforms to the grooves 40 of the free contact end 30 and thus provides a fluid sealing contact between the enclosing member 6 and the capsule 3 at a relatively low fluid pressure during start up of brewing but also provides a fluid sealing contact at the much higher fluid pressure in the enclosing member outside the capsule during brewing. This close conformation to the grooves 40 of the enclosing member is indicated in FIG. 3C which shows the capsule 2 of the invention after use, and which clearly indicates that the outwardly extending flange 20 comprises deformations 40' which conform to the grooves 40 of the enclosing member.

Now exemplary embodiments of a sealing member 28 at the outwardly extending flange 20 of the capsule 2 according to the invention will be described in more detail with regard to FIG. 4.

Figure 4A:
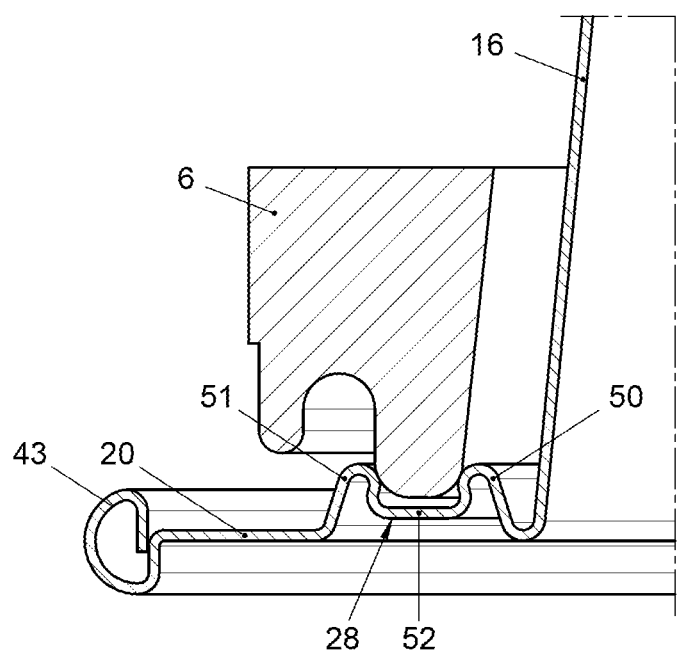
FIG. 4A shows a first embodiment of a sealing member at the outwardly extending flange of a capsule according to the invention.

FIG. 4A shows a first embodiment of a sealing member 28 forming an additional bearing at the outwardly extending flange 20 of a capsule 2 according to the invention. The sealing member and the remainder of the capsule body are made of the same plate material. The sealing member 28 comprises two spaced projections 50 and 51, each projecting axially from a base portion of the outwardly extending flange 20, to which base portion the cover 14 is attached, in a direction away from the cover 14. A plateau 52 is present between the two projections 50 and 51. The distance between the two projections 50 and 51 is such that the free contact end of the annular element 6 is squeezed between converging surfaces of the two projections 50 and 51 if the capsule is positioned in the enclosing member of the beverage preparation device and the enclosing member is closed by means of a closing member of the beverage preparation device. In the embodiment shown in FIG. 4A the plateau is positioned at a distance above the portion of the outwardly extending flange 20 between the sealing member 28 and the curled edge 43 and is substantially flat. The distance between the two projections 50 and 51 is further such that the free contact end of the annular element is contacted by the two projections 50 and 52 if the capsule is positioned in the enclosing member of the beverage preparation device and the enclosing member is closed by means of a closing member of the beverage preparation device. Further, the two spaced projections 50, 51 and the plateau 52 are arranged such that the free contact end of the annular element is contacted by the plateau if the capsule is positioned in the enclosing member of the beverage preparation device and the enclosing member is closed by means of a closing member of the beverage preparation device. As can be seen in FIG. 4A each projection 50, 51 comprises a projection side wall which is inclined with regard to the outwardly extending flange 20 of the aluminum capsule body. The projection side wall is configured such that it is deformed easily if the capsule is positioned in the enclosing member of the beverage preparation device and the enclosing member is closed by means of a closing member of the beverage preparation device.

Figure 4B:
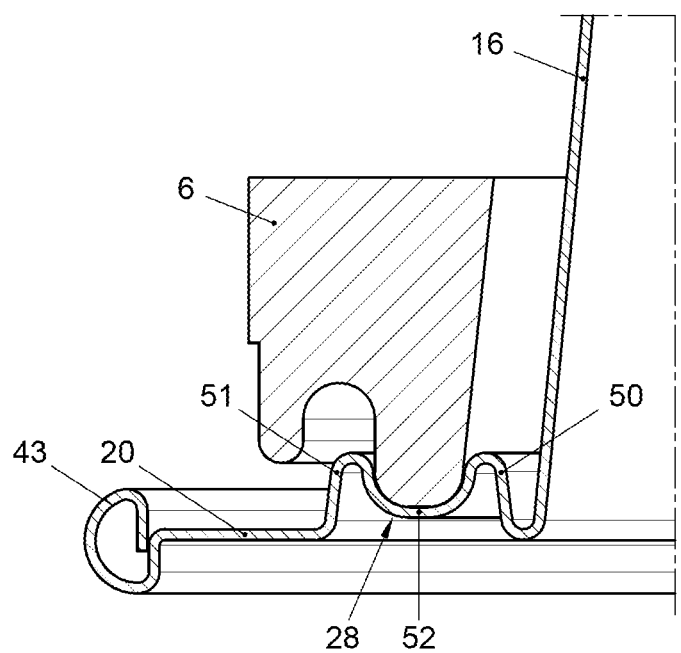
FIG. 4B shows a second embodiment of a sealing member at the outwardly extending flange of a capsule according to the invention.

FIG. 4B shows a second embodiment of a sealing member 28 at the outwardly extending flange 20 of a capsule according to the invention. When compared with FIG. 4A the following differences are noted. Each projection 50, 51 now comprises a projection side wall which is transverse with regard to the outwardly extending flange 20 of the aluminum capsule body. Further, in this second embodiment the plateau 52 is curved, preferably conforming to the shape of the free contact end of the annular element 6.

Figure 4C:
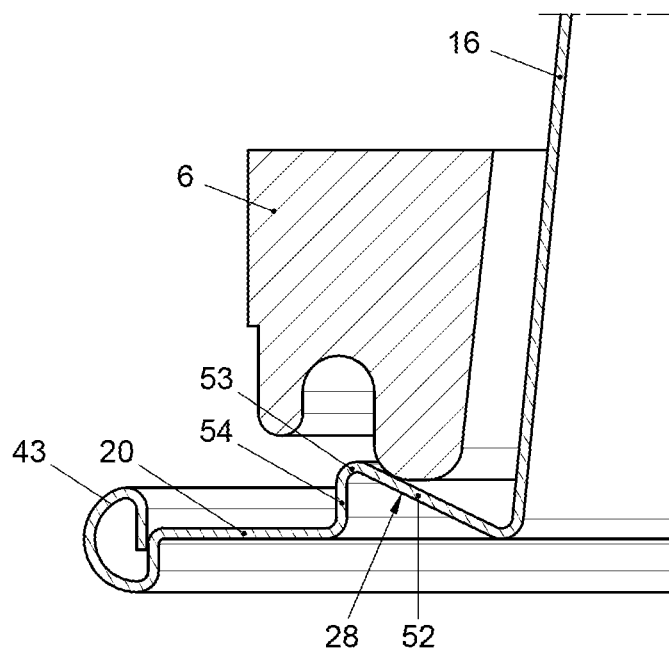
FIG. 4C shows a third embodiment of a sealing member at the outwardly extending flange of a capsule according to the invention.

FIG. 4C shows a third embodiment of a sealing member 28 at the outwardly extending flange 20 of a capsule according to the invention, which together with the side wall 16 of the aluminum capsule body forms an additional bearing for the enclosing member. The shown sealing member 28 comprises a projection 53 projecting from the outwardly extending flange 20 and an inclined, substantially flat plateau 52 between a rounded topmost end portion of the projection 53 and the side wall 16 of the aluminum capsule body. In this embodiment the bearing is formed by the projection 53, the plateau 52 and the side wall 16 of the aluminum capsule body. The distance between the top of the projection 53 and the side wall 16 is such that the free contact end of the annular element 6 is enclosed by the projection 53 and the side wall 16 of the aluminum capsule body if the capsule is positioned in the enclosing member of the beverage preparation device and the enclosing member is closed by means of a closing member of the beverage preparation device. In particular the distance between the projection 53 and the side wall 16 of the aluminum capsule body is such that the free contact end of the annular element 6 is contacted by the projection 53 and the side wall 16 and in the shown embodiment also the plateau 52 of the aluminum capsule body if the capsule is positioned in the enclosing member of the beverage preparation device and the enclosing member is closed by means of a closing member of the beverage preparation device.

Figure 4D:
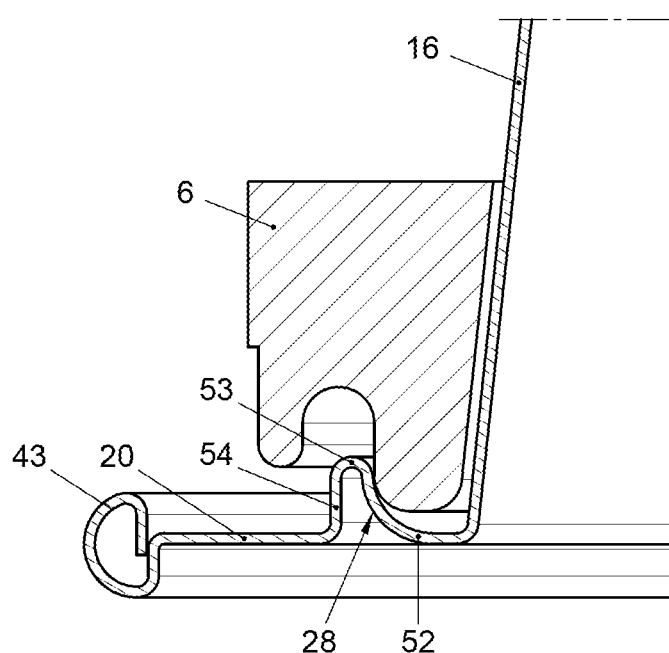
FIG. 4D shows a fourth embodiment of a sealing member at the outwardly extending flange of a capsule according to the invention.
Figure 4E:
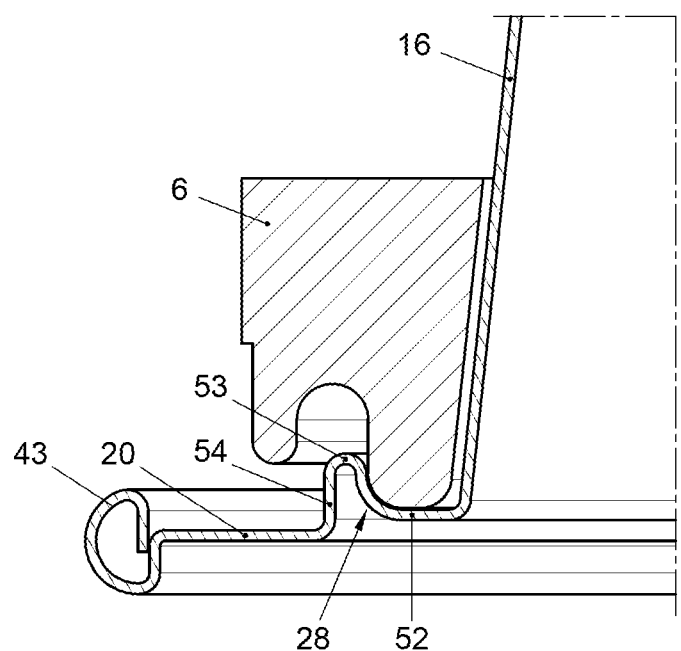
FIG. 4E shows a fifth embodiment of a sealing member at the outwardly extending flange of a capsule according to the invention.

FIG. 4D shows a fourth embodiment of a sealing member 28 at the outwardly extending flange 20 of a capsule according to the invention, which together with the side wall 16 of the aluminum capsule body forms an additional bearing for the enclosing member. When compared with FIG. 4C the following differences are noted. In this fourth embodiment the plateau 52 is curved, and comprises a curved portion and also a flat portion which is situated at the same level as the portion of the outwardly extending flange 20 between the projection 53 and the curved edge 43. The curved portion preferably conforms to the shape of the free contact end of the annular element 6. FIG. 4E shows a fifth embodiment of a sealing member 28 at the outwardly extending flange 20 of a capsule according to the invention, which together with the side wall 16 of the aluminum capsule body forms a bearing for the enclosing member. When compared with FIG. 4D the following difference is noted. In this fifth embodiment the flat portion of the plateau 52 is situated at a distance above the portion of the outwardly extending flange 20 between the projection 53 and the curved edge 43. The distance between 2 the projection 53 is preferably 0.9-1.25 mm, which allows the free end of the closing member of widely used and commercially available beverage preparation devices (such as the Citiz, Lattisima, U, Maestria, Pixie, Inissia and Essenza) to be reliably squeezed against the projections 53 with the side wall 16 in close proximity thereto.

In the embodiments shown in FIGS. 4C to 4E the projection 53 comprises an outer projection side wall 54 which is transverse to the portion of the outwardly extending flange between the projection 53 and the curled edge 43, but in other embodiments this outer projection side wall 54 can be inclined with regard to the portion of the outwardly extending flange 20.

In all the embodiments shown in FIGS. 4A to 4E each of the projections comprises a projection top constituting a portion of the projection, for instance a half, a third or a quarter of the projection, that is axially most distal from the base portion of the flange 28 to which the cover 14 is attached. At least one projection but preferably all projections forming the additional bearing is/are configured such that its projection top exerts a radial force on the free contact end of the annular element 6 if the capsule is positioned in the enclosing member of the beverage preparation device and the enclosing member is closed by means of a closing member of the beverage preparation device.

Figure 4F:
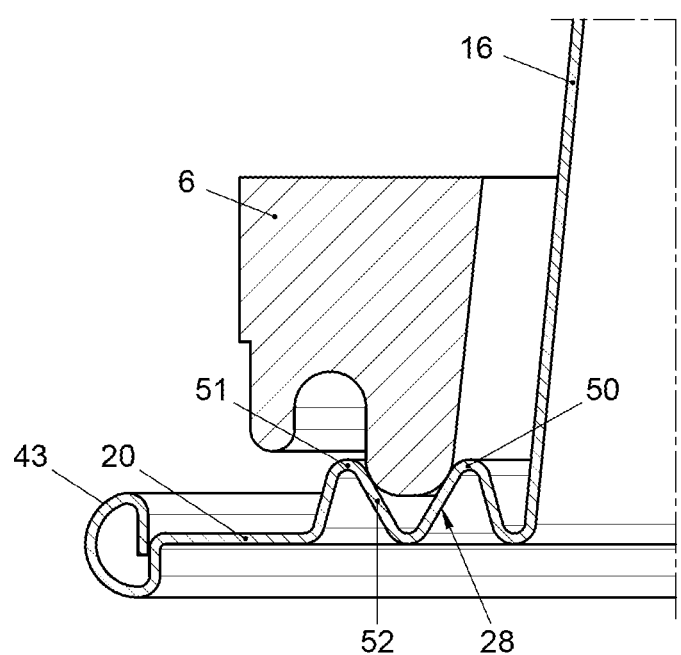
FIG. 4F shows a sixth embodiment of a seal member at the outwardly extending flange of a capsule according to the invention.

FIG. 4F shows a sixth embodiment of a seal member 28 at the outwardly extending flange 20 of a capsule according to the invention. When compared with e.g. FIG. 4B the following differences are noted. In this sixth embodiment the plateau 52 is V-shaped, with the bottom of the V-shaped being at the same level as the base portion of the outwardly extending flange 20 between the outer projection 51 and the curled edge 43. In this manner no bearing for the free contact end of the annular member 6 is formed, but the projection top of the inner projection 50 exerts a radial force direct outwardly on the free contact end of the annular element 6 and the projection top of the outer projection 51 exerts a radial force direct inwardly on the free contact end of the annular element 6 if the capsule is positioned in the enclosing member of the beverage preparation device and the enclosing member is closed by means of a closing member of the beverage preparation device. In this manner the free contact end is squeezed by the sealing member 28 thereby providing a satisfactory seal.

In capsules in which the sealing structure 28 has projections 50, 51 and a plateau or through 52 in between, as by way of example shown in FIGS. 4A, 4B, and 4F, the center of the plateau or through 52, which extends circumferentially around the center axis of the capsule, preferably has a diameter of 29-33 mm, more preferably 30.0-31.4 mm and most preferably 30.3-31.0 mm, so that (seen in radial cross-section) the free end of the closing member of widely used and commercially available beverage preparation devices (such as the Citiz, Lattisima, U, Maestria, Pixie, Inissia and Essenza) lands accurately centered between the projections 50, 51 and the squeezing effect is evenly distributed over the inner and outer projections 50, 51. For effective squeezing in such apparatuses, the distance between projections 50, 51 is preferably 0.9-1.25 mm.

Figure 4G:
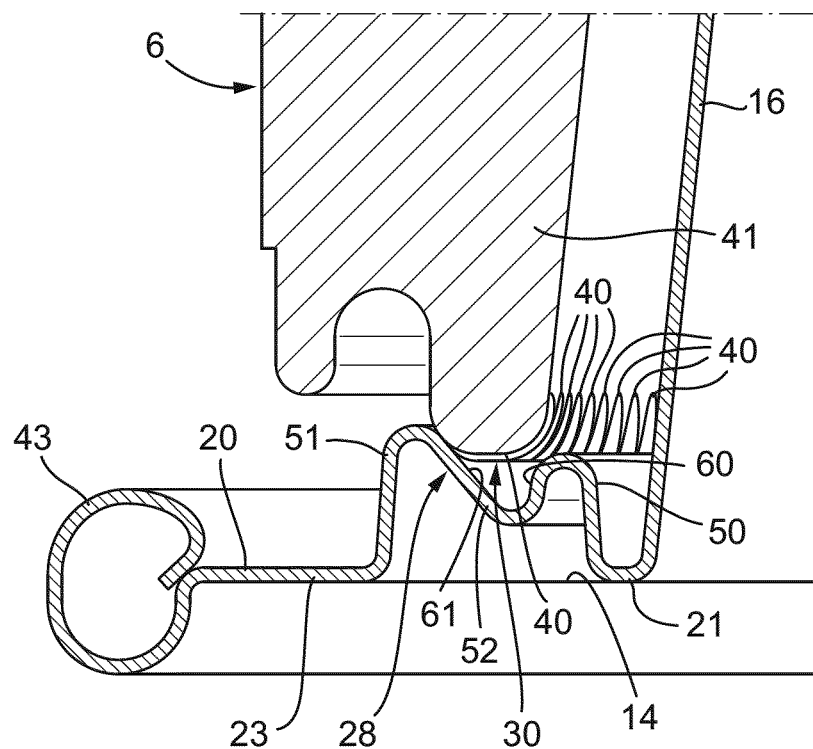
FIG. 4G shows a seventh embodiment of a seal member at the outwardly extending flange of a capsule according to the invention.

FIG. 4G shows a seventh embodiment of a seal member 28 at the outwardly extending flange 20 of a capsule according to the invention. As also shown in FIG. 2, the enclosing member 6 of the beverage preparation device has an annular element 41 having a free contact end 30 with a plurality of radially extending open grooves 40 of which some are shown in FIG. 4G.

As in the examples shown in FIGS. 4A, 4B and 4F, the sealing member 28 has two spaced projections 50 and 51, each projecting axially from a base portion 21, 23 of the outwardly extending flange 20, to which base portions 21, 23 the cover 14 is attached, in a direction away from the cover 14. As in the example shown in FIG. 4F, a generally V-shaped plateau 52 having a rounded bottom is located between the two projections 50 and 51.

A difference compared with the examples shown in FIGS. 4A, 4B and 4F is that, in the example shown in FIG. 4G, a first one of the two projections 51 projects further from the base portions 21, 23 of the outwardly extending flange 20 than a second one of the two projections 50.

As shown in the more schematical FIGS. 5A-5D, the free contact end 30 of the annular element 41 first contacts the first one of the two projections 51 (FIG. 5A) and subsequently contacts the second one of the two projections (FIG. 5B) if the capsule is positioned in the enclosing member 6 of the beverage preparation device and as the enclosing member 6 is closed by means of the closing member of the beverage preparation device.

As can also be seen from FIGS. 5A-5D, if the enclosing member is closed by means of the closing member, the free contact end 30 of the annular element 41 has a first circumferential surface portion 71 contacting the first projection 51 and a second circumferential surface portion 70 contacting the second projection 50. The radially extending open grooves 40 are deeper in the second surface portion 70 than in the first surface portion 71 or the grooves may be absent in the first surface portion 71.

Figure 5A:
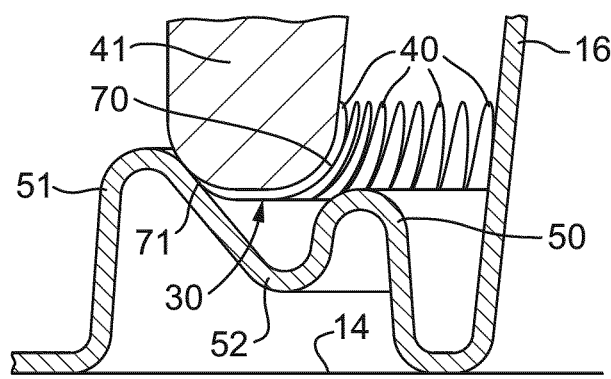
FIGS. 5A-5D are schematic representations of successive stages of deformation of the seventh embodiment of a seal member at the outwardly extending flange of a capsule according to the invention if the capsule is positioned in the enclosing member of the beverage preparation device and as the enclosing member is closed by means of a closing member of the beverage preparation device.
Figure 5B:
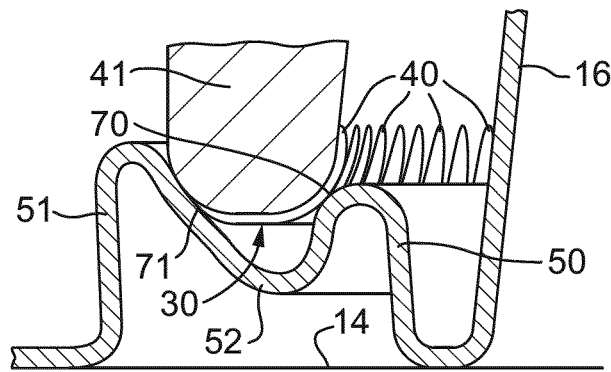
Figure 5C:
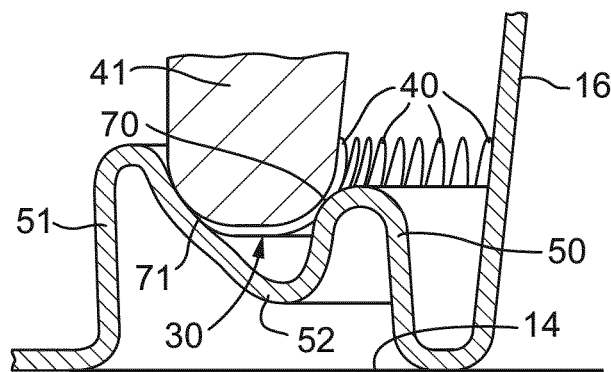
Figure 5D:
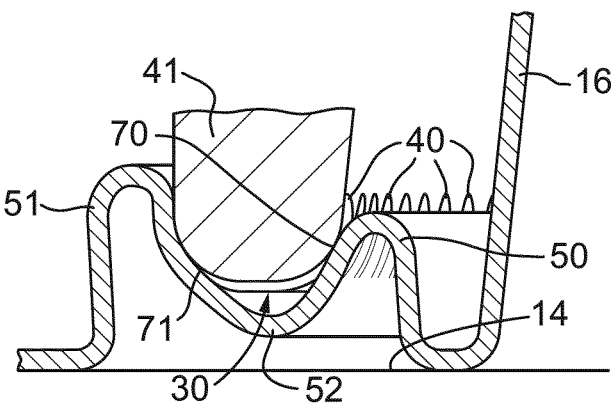

When the free contact end 30 of the annular element 41 contacts the first one of the two projections 51, the capsule is centered relative to the enclosing member 6 and an initial seal is achieved which provides satisfactory sealing against a low pressure drop at a relatively low pressing force (FIGS. 5B and 5C). When the free contact end 30 of the annular element 41 contacts the second one of the two projections 50, more contact force is exerted and the second projection exerts a relatively high counter force as it is deformed (FIGS. 5C and 5D), the relatively high counter pressure causes material of the second projection to be reliably deformed locally so that it is pressed into the relatively deep areas of the recesses 40.

The distance between the two projections 50 and 51 is such that ultimately (FIG. 5D) the free contact end 30 of the annular element 41 is squeezed between converging surfaces of the two projections 50 and 51 when the enclosing member is fully closed by means of the closing member. As can be seen in FIG. 4A each projection 50, 51 comprises a projection side wall which is inclined with regard to the outwardly extending flange 20 of the aluminum capsule body.

The plateau 52 has a bottom end which is radially closer to the projection top of the second one of the projections 50 than to the projection top of the first one of the projections 51. This allows the higher first projection 51 to have a relatively long and (in top view) wide side on its side facing the second projection 52. This is allows centering of the capsule from a wide range of initial positions.

The sloping side surface 61 one a side of the first projection 51 facing the second one of the two projections 50 has a greater size from its top end to its lower end than the opposite second side surface of the second projection 52. Also this feature contributes to the free contact end 30 of the annular element 41 first contacting the first one of the two projections 51 and subsequently contacting the second one of the two projections 50 as the enclosing member 6 is closed by means of the closing member. Moreover, the relatively large width of the first side surface causes the surface to be deformable relatively easily when contact by an edge area of the free end 30 of the annular element 41, which is advantageous for providing a satisfactory seal already at a relatively low contact pressure. The difference in size from the top to the end is preferably at least 10% and more preferably at least 20%.

For the same purposes, it is also advantageous that the first sloping side surface 61 has a conical generatrix at an enclosed angle relative to the cover 14 that is smaller than the enclosed angle between a second conical generatrix between the second side surface 60 and the cover 14. The difference between the angles is preferably at least 10° and more preferably at least 20°. The first angle is preferably between 40° and 60° and more preferably larger than 45° and/or smaller than 55°. The second angle is preferably between 60° and 85° and more preferably larger than 70° and/or smaller than 80°.

For achieving sequential low and high pressure sealings against inner and outer circumferential surface portions of the free end 30 of the annular element 41, it is also advantageous if the free contact end 30 of the annular element 41 contacts the first projection 61 at a first radial distance from an extreme top end of the first projection and contacts the second projection at a second radial distance from an extreme top end from the second projection which is smaller than this first distance. This causes or contributes to the first projection 51 deforming more easily providing the low pressure seal, while the second projection 50 exerts more counter pressure while deforming and provides the high pressure seal. The higher average counter pressure exerted by the second projection 50 is also advantageous for achieving an accommodation to the relatively deep recesses 40 in the inner edge area of the free end 30 of the annular element 41 that is sufficient to achieve a satisfactory high pressure seal.

The plateau 52 is axially spaced from the cover 14. As illustrated by FIGS. 5A-5D, this allows the plateau 52 between the projections 50, 51 to be displaced in the direction of movement of the free end 30 of the annular element 41 as the enclosing member 6 is closed, urging the projections 50, 51 to be tilted and roll off inwardly against the free end 30 of the annular element 41 as the enclosing member 6 is closed. This increases the radial sealing pressure that is exerted (in addition to the axial closing pressure), so that an increased sealing pressure is available for providing a satisfactory seal.

In the foregoing specification, the invention has been described with reference to specific examples of embodiments of the invention. It will, however, be evident that various modifications and changes may be made therein without departing from the broader spirit and scope of the invention as set forth in the appended claims.

The invention claimed is:

1. A system for preparing a potable beverage from a capsule using a fluid supplied under pressure into the capsule, the capsule comprising:
a beverage preparation device comprising an enclosing member for receiving the capsule, wherein the enclosing member comprises a fluid injector for supplying fluid under pressure into the capsule, wherein the beverage preparation device further comprises a closing member for closing the enclosing member of the beverage preparation device, wherein the enclosing member of the beverage preparation device further comprises an annular element having a central annular element axis and a free contact end, said free contact end of the annular element being provided with a plurality of radially extending open grooves;
a capsule containing a substance for the preparation of a potable beverage by extracting and/or dissolving the substance by the fluid supplied under pressure into the capsule by the fluid injector of the beverage preparation device, wherein the capsule comprises:
an aluminum capsule body having a central capsule body axis, said aluminum capsule body being provided with a bottom, a side wall and an outwardly extending flange,
an aluminum cover attached to the outwardly extending flange, the cover hermetically closing the capsule,
a sealing member at the outwardly extending flange for providing a fluid sealing contact with the enclosing member of the beverage preparation device if the capsule is positioned in the enclosing member of the beverage preparation device and the enclosing member is closed by the closing member of the beverage preparation device, such that the outwardly extending flange of the capsule and at least a portion of the sealing member of the capsule are sealingly engaged between the enclosing member and the closing member of the beverage preparation device,
wherein, the sealing member is integral with the outwardly extending flange and comprises at least one projection projecting from the outwardly extending flange, said at least one projection comprising a projection top, and wherein the at least one projection is configured such that its projection top exerts a radial force on the free contact end of the annular element if the capsule is positioned in the enclosing member of the beverage preparation device and the enclosing member is closed by means of the closing member of the beverage preparation device.

2. The system according to claim 1, wherein the sealing member comprises a further projection projecting from the outwardly extending flange and a plateau between said two projections, wherein the distance between the two projections is such that the free contact end of the annular element is squeezed between converging surfaces of the two projections if the capsule is positioned in the enclosing member of the beverage preparation device and the enclosing member is closed by the closing member of the beverage preparation device.

3. The system according to claim 2, wherein a first one of the two projections projects further from a base portion of the outwardly extending flange, to which base portion the cover is attached, than a second one of the two projections, such that the free contact end of the annular element first contacts the first one of the two projections and subsequently contacts the second one of the two projections if the capsule is positioned in the enclosing member and as the enclosing member is closed by the closing member.

4. The system according to claim 3, wherein the plateau has a bottom end which is radially closer to the projection top of said second one of said projections than to the projection top of said first one of said projections.

5. The system according to claim 2, wherein a first one of the two projections has a first sloping side surface one a side facing a second one of the two projections and the second one of the two projections has a second sloping side surface on a side facing the first one of the two projections, said first side surface having a greater size from its top end to its lower end than said second side surface, such that the free contact end of the annular element first contacts the first one of the two projections and subsequently contacts the second one of the two projections if the capsule is positioned in the enclosing member and as the enclosing member is closed by the closing member.

6. The system according to claim 2, wherein a first one of the two projections has a first conical sloping side surface one a side facing a second one of the two projections and the second one of the two projections has a second sloping side surface on a side facing the first one of the two projections, said first side surface having a conical generatrix at a first enclosed angle relative to the cover, said second side surface having a conical generatrix at a second enclosed angle relative to the cover, said first angle being smaller than said second angle, such that the free contact end of the annular element first contacts the first one of the two projections and subsequently contacts the second one of the two projections if the capsule is positioned in the enclosing member and as the enclosing member is closed by the closing member.

7. The system according to claim 6, wherein the first angle is between 40° and 60°.

8. The system according to claim 6, wherein the second angle is between 60° and 85°.

9. The system according to claim 2, wherein said free contact end of the annular element contacts a first one of said two projections at a first radial distance from an extreme top end of said projection and contacts a second one of said two projections at a second radial distance from an extreme top end from said second projection if the capsule is positioned in the enclosing member and as the enclosing member is closed by the closing member, wherein a first one of the two projections has an extreme top end extending around the system axis at a first diameter and wherein the second one of said two projections has an extreme top end extending around the system axis at a second diameter different from said first diameter, such that said first radial distance is larger than said second radial distance.

10. The system according to claim 3, wherein said free contact end of the annular element has a first circumferential surface portion contacting said first projection, if the capsule is positioned in the enclosing member and as the enclosing member is closed by the closing member, and a second circumferential surface portion contacting said second projection, if the capsule is positioned in the enclosing member and as the enclosing member is closed by the closing member, wherein said free contact end of the annular element is provided with the plurality of radially extending open grooves, said grooves being deeper in said second surface portion than in said first surface portion or said grooves are absent in said first surface portion.

11. The system according to claim 3, wherein the first one of the two projections is an outer one of the two projections and wherein the first circumferential surface portion is radially outside of the second circumferential surface portion.

12. The system according to claim 2, wherein the plateau is axially spaced from the cover.

13. The system according to claim 2, wherein the distance between the two projections is such that the free contact end of the annular element is contacted by the two projections if the capsule is positioned in the enclosing member of the beverage preparation device and the enclosing member is closed by the closing member of the beverage preparation device.

14. The system according to claim 2, wherein the two spaced projections and the plateau are arranged such that the free contact end of the annular element is contacted by the plateau if the capsule is positioned in the enclosing member of the beverage preparation device and the enclosing member is closed by the closing member of the beverage preparation device.

15. The system according to claim 2, wherein the capsule comprises a bearing for the enclosing member of the beverage preparation device if the capsule is positioned in the enclosing member of the beverage preparation device and the enclosing member is closed by the closing member of the beverage preparation device, said bearing enclosing at least a portion of the free contact end of the annular element and said bearing being formed by the two projections and the plateau there between.

16. The system according to claim 2, wherein the plateau is substantially flat.

17. The system according to claim 2, wherein the plateau comprises a curved portion.

18. The system according to claim 17, wherein the plateau is V-shaped.

19. The system according to claim 1, wherein the capsule contains an extractable product as substance for the preparation of a potable beverage, said extractable product being roasted and ground coffee.

20. The system according to claim 1, wherein the outer diameter of the outwardly extending flange of the capsule is larger than the diameter of the bottom of the capsule.

21. The system according to claim 20, wherein the outer diameter of the outwardly extending flange is 37.1 mm and the diameter of the bottom of the capsule is about 23.3 mm.

22. The system according to claim 1, wherein the thickness of the aluminum capsule body is such that it is deformed easily if the capsule is positioned in the enclosing member of the beverage preparation device and the enclosing member is closed by the closing member of the beverage preparation device.

23. The system according to claim 1, wherein the thickness of the aluminum cover is 15 to 65 micrometer.

24. The system according to claim 1, wherein the thickness of the aluminum cover is smaller than the thickness of the aluminum capsule body.

25. The system according to claim 1, wherein the aluminum cover is arranged to tear open on the closing member of the beverage preparation device, such as an extraction plate of the beverage preparation device under the influence of fluid pressure in the capsule.

26. The system according to claim 1, wherein the side wall of the aluminum capsule body has a free end opposite the bottom, the outwardly extending flange extending from said free end of the side wall in a direction at least substantially transverse to the central capsule body axis.

27. The system according to claim 26, wherein the outwardly extending flange comprises a curled outer edge.

28. The system according to claim 27, wherein an inner edge of the curled outer edge of the outwardly extending flange has a radius about the central capsule body axis of at least 32 mm.

29. The system according to claim 26, wherein the sealing member is positioned between the free end of the side wall of the aluminum capsule body and an inner edge of the curled outer edge of the outwardly extending flange.

30. The system according to claim 26, wherein the curled outer edge of the outwardly extending flange has a largest dimension of 1.2 millimeter.

31. The system according to claim 26, wherein the inner diameter of the free end of the side wall of the aluminum capsule body is 29.5 mm.

32. The system according to claim 26, wherein the distance between the free end of the side wall of the aluminum capsule body and an outermost edge of the outwardly extending flange is 3.8 millimeter.

33. The system according to claim 26, wherein a height of the aluminum capsule body is 28.4 mm.

34. The system according to claim 1, wherein the aluminum capsule body is truncated.

35. The system according to claim 1, wherein the bottom of the aluminum capsule body has a largest inner diameter of 23.3 mm.

36. The system according to claim 35, wherein the bottom of the aluminum capsule body is truncated, and wherein the bottom further has a generally flat central portion opposite the cove.

37. The system according to claim 1, wherein the height of the sealing member portion that is contacted first by the free end of the closing enclosure member is at least 0.1 mm.

38. The system according to claim 1, wherein the capsule comprises an inner surface, and wherein on the inner surface of at least the side wall of the capsule an inner coating is provided.

39. The system according to claim 38, wherein the aluminum cover of the capsule is attached to the outwardly extending flange by a sealing lacquer, said inner coating being composed of the same material as the sealing lacquer.

40. The system according to claim 38, wherein the sealing member is free from an inner coating.

41. The system according to claim 1, wherein the capsule comprises an outer surface, and wherein on the outer surface of the capsule a color lacquer is provided.

42. The system according to claim 41, wherein on an outer surface of the color lacquer an outer coating is provided.

43. The system according to claim 41, wherein the sealing member is free from a color lacquer.

44. The system according to claim 1, wherein the at least one projection comprises a projection side wall which is inclined with regard to the outwardly extending flange of the aluminum capsule body, said projection side wall being configured such that it is deformed easily if the capsule is positioned in the enclosing member of the beverage preparation device and the enclosing member is closed by the closing member of the beverage preparation device.

45. The system according to claim 44, wherein the distance between the projection and the side wall of the aluminum capsule body is such that the free contact end of the annular element is contacted by the projection and the side wall of the aluminum capsule body if the capsule is positioned in the enclosing member of the beverage preparation device and the enclosing member is closed by the closing member of the beverage preparation device.

46. The system according to claim 1, wherein the sealing member in addition to the at least one projection projecting from the outwardly extending flange comprises a plateau between the projection top and the side wall of the aluminum capsule body.

47. The system according to claim 46, wherein a bearing is formed by the projection, plateau and the side wall of the aluminum capsule body, wherein the distance between the projection and the side wall is such that the free contact end of the annular element is enclosed by the projection and the side wall of the aluminum capsule body if the capsule is positioned in the enclosing member of the beverage preparation device and the enclosing member is closed by the closing member of the beverage preparation device.

48. The system according to claim 46, wherein the projection, the side wall of the aluminum capsule body and the plateau are arranged such that the free contact end of the annular element is contacted by the plateau if the capsule is positioned in the enclosing member of the beverage preparation device and the enclosing member is closed by the closing member of the beverage preparation device.

49. The system according to claim 1, wherein, in use, the maximum fluid pressure in the enclosing member of the beverage preparation device is in the range of 6-20 bar.

50. The system according to claim 1, wherein the system is arranged such that, in use, during brewing, a free end of the enclosing member of the beverage preparation device exerts a force F2 on the sealing member of the capsule to provide a fluid sealing contact between the outwardly extending flange of the capsule and the enclosing member of the beverage preparation device, wherein F2 is in the range of 500-1500 N when the fluid pressure P2 in the enclosing member of the beverage preparation device outside the capsule is in the range of 6-20 bar.

51. The system according to claim 50, wherein the system is arranged such that, in use, prior to or at the start of brewing, a free end of the enclosing member of the beverage preparation device exerts a force F1 on the sealing member of the capsule to provide a fluid sealing contact between the outwardly extending flange of the capsule and the enclosing member of the beverage preparation device, wherein F1 is in the range of 30-150 N when the fluid pressure P1 in the enclosing member of the beverage preparation device outside the capsule is in the range of 0.1-4 bar.

52. The system according to claim 51, wherein the plurality of radially extending open grooves are uniformly spaced relative to each other in tangential direction of the free contact end of the annular element of the beverage preparation device.

53. The system according to claim 52, wherein the greatest width of each groove is 0.9-1.1 mm, wherein a maximal height of each groove in an axial direction of the enclosing member of the beverage preparation device is 0.01-0.09 mm, wherein the number of grooves is 90 to 110, and wherein the radial width of the free contact end at the location of the grooves is 0.05-0.9 mm.

54. The system according to claim 51, wherein during use when the closing member of the beverage preparation device closes the enclosing member of the beverage preparation device at least the free contact end of the enclosing member of the beverage preparation device can move relative to the closing member of the beverage preparation device under the effect of the pressure of the fluid in the enclosing member of the beverage preparation device towards the closing member of the beverage preparation device for applying the maximum force between the flange of the capsule and the free end of the enclosing member of the beverage preparation device, wherein the enclosing member comprises a first part and a second part wherein the second part comprises the free contact end of the enclosing member wherein the second part can move relative to the first part between a first and second position wherein the second part can move from the first position towards the second position in the direction of the closing member under the influence of fluid pressure in the enclosing member wherein the force F1 is reached if the second part is in the first position with a fluid pressure P1 in the enclosing member and wherein the force F2 is reached if the second part is moved towards the second position under the influence of the fluid pressure P2 in the enclosing member.

55. The system according to claim 1, wherein during use when the closing member of the beverage preparation device closes the enclosing member of the beverage preparation device the enclosing member of the beverage preparation device can move relative to the closing member of the beverage preparation device under the effect of the pressure of the fluid in the enclosing member of the beverage preparation device towards the closing member of the beverage preparation device for applying the maximum force between the flange of the capsule and the free end of the enclosing member of the beverage preparation device.

* * * * *